(12) United States Patent
Song et al.

(10) Patent No.: US 11,869,560 B2
(45) Date of Patent: Jan. 9, 2024

(54) OBJECT TRACKING SYSTEM INCLUDING POLARIZATION SELECTIVE OPTICAL ELEMENT

(71) Applicant: Meta Platforms Technologies, LLC, Menlo Park, CA (US)

(72) Inventors: Hyunmin Song, Redmond, WA (US); Sanaz Alali, Woodenville, WA (US); Yun-Han Lee, Redmond, WA (US); Zhisheng Yun, Sammamish, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 6 days.

(21) Appl. No.: 17/541,223

(22) Filed: Dec. 2, 2021

(65) Prior Publication Data
US 2022/0270645 A1 Aug. 25, 2022

Related U.S. Application Data

(60) Provisional application No. 63/171,145, filed on Apr. 6, 2021, provisional application No. 63/152,334, filed on Feb. 22, 2021.

(51) Int. Cl.
*G11B 7/1353* (2012.01)
*G11B 7/131* (2012.01)
*G02B 27/28* (2006.01)

(52) U.S. Cl.
CPC .......... *G11B 7/1353* (2013.01); *G02B 27/283* (2013.01); *G11B 7/131* (2013.01)

(58) Field of Classification Search
CPC .... G11B 7/1353; G11B 7/131; G02B 27/283; G02B 5/3016; G02B 5/3083; G02B 27/0093
See application file for complete search history.

(56) References Cited

U.S. PATENT DOCUMENTS

| 4,398,805 A | 8/1983 | Cole |
| 5,315,418 A | 5/1994 | Sprague et al. |
| 6,309,068 B1 | 10/2001 | Kohayakawa |
| 2005/0200776 A1 | 9/2005 | Hara et al. |
| 2015/0369983 A1* | 12/2015 | Oki ...................... G02B 5/0841 349/193 |

(Continued)

FOREIGN PATENT DOCUMENTS

| CN | 111465887 A | 7/2020 |
| JP | 2017068111 A | 4/2017 |
| JP | 2018173661 A | 11/2018 |
| WO | 03091792 A1 | 11/2003 |

OTHER PUBLICATIONS

International Search Report and Written Opinion for International Application No. PCT/US2022/017233, dated Jul. 21, 2022, 13 pages.

(Continued)

*Primary Examiner* — Andrew Sasinowski
(74) *Attorney, Agent, or Firm* — MILLBURN IP PLLC

(57) ABSTRACT

A system includes a polarization selective optical element configured to diffract a light reflected by an object into a plurality of signal lights. The system also includes at least one optical sensor configured to receive the signal lights and generate a plurality of tracking signals for tracking the object.

20 Claims, 18 Drawing Sheets

(56) References Cited

U.S. PATENT DOCUMENTS

| | | | |
|---|---|---|---|
| 2016/0062020 A1* | 3/2016 | Kogure | G02B 5/3083 |
| | | | 359/489.07 |
| 2016/0077338 A1* | 3/2016 | Robbins | G02B 27/4205 |
| | | | 359/489.08 |
| 2019/0107719 A1 | 4/2019 | Edwin et al. | |
| 2019/0243147 A1* | 8/2019 | Smithwick | G02B 27/0103 |
| 2019/0250459 A1 | 8/2019 | Lo et al. | |
| 2019/0360653 A1* | 11/2019 | Toko | G02B 27/283 |
| 2020/0049872 A1 | 2/2020 | Peng et al. | |
| 2020/0142213 A1* | 5/2020 | Sato | G02F 1/13363 |
| 2020/0371474 A1* | 11/2020 | Ouderkirk | G03H 1/0248 |

OTHER PUBLICATIONS

Invitation to Pay Additional Fees and Communication Relating to The Results of The Partial International Search, issued in International Application No. PCT/US2022/017233, dated May 30, 2022, 8 pages.

International Search Report and Written Opinion for International Application No. PCT/US2022/017135 dated Jul. 11, 2022, 12 pages.

International Search Report and Written Opinion for International Application No. PCT/US2022/017273, dated Jul. 15, 2022, 12 pages.

Invitation to Pay Additional Fees for International Application No. PCT/US2022/017135 dated May 19, 2022, 9 pages.

Invitation to Pay Additional Fees for International Application No. PCT/US2022/017273, dated May 24, 2022, 8 pages.

Schulz M., et al., "Giant Intrinsic Circular Dichroism of Prolinol-Derived Squaraine Thin Films," Nature Communications, 2018, 9:2413, pp. 1-10, DOI: 10.1038/s41467-018-04811-7.

Sánchez-Carnerero E.M., et al., "Unprecedented Induced Axial Chirality in a Molecular BODIPY Dye: Strongly Bisignated Electronic Circular Dichroism in the Visible Region," Chemical Communications, 2013, vol. 49, pp. 11641-11643, DOI: 10.1039/c3cc47570k.

* cited by examiner ized imaging device that may
OBJECT TRACKING SYSTEM INCLUDING POLARIZATION SELECTIVE OPTICAL ELEMENT

CROSS REFERENCE TO RELATED APPLICATIONS

This application claims the benefit of priority to U.S. Provisional Application No. 63/152,334, filed on Feb. 22, 2021, and U.S. Provisional Application No. 63/171,145, filed on Apr. 6, 2021. The contents of the above-mentioned applications are incorporated herein by reference in their entirety.

TECHNICAL FIELD

The present disclosure relates generally to optical systems and, more specifically, to an object tracking system including a polarization selective optical element.

BACKGROUND

Object tracking devices, e.g., eye tracking devices, face tracking devices, have been implemented in various systems for numerous applications in a large variety of fields, e.g., near-eye displays ("NEDs"), head-up displays ("HUDs"), head-mounted displays ("HMDs"), smart phones, laptops, televisions, vehicles, etc. For example, object tracking devices have been implemented in augmented reality ("AR"), virtual reality ("VR"), and/or mixed reality ("MR") applications. Through monitoring an eye, the surrounding region of the eye, and/or the face of a user, a three-dimensional ("3D") head pose, facial expressions, and gazes of the user may be tracked in real time, which can be used for driver monitoring, biometrics, virtual eyewear try-on, virtual jewelry try-on, virtual makeup try-on, etc. Further, the psychological state and/or changes in the psychological state of the user, as well as physical characteristics of the user, may be determined. Such information can be used by the system to, e.g., determine what content to provide to the user, and/or for controlling operations of the system in which the object-tracking devices are implemented.

SUMMARY OF THE DISCLOSURE

One aspect of the present disclosure provides a system. The system includes a polarization selective optical element configured to diffract a light reflected by an object into a plurality of signal lights. The system also includes at least one optical sensor configured to receive the signal lights and generate a plurality of tracking signals for tracking the object.

Another aspect of the present disclosure provides a system. The system includes a light source configured to emit a light to illuminate an object, the light being reflected by the object. The system also includes a polarization selective optical element configured to diffract the light reflected by the object into a plurality of signal lights. The system further includes at least one optical sensor configured to receive the signal lights and generate a plurality of tracking signals for tracking the object.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
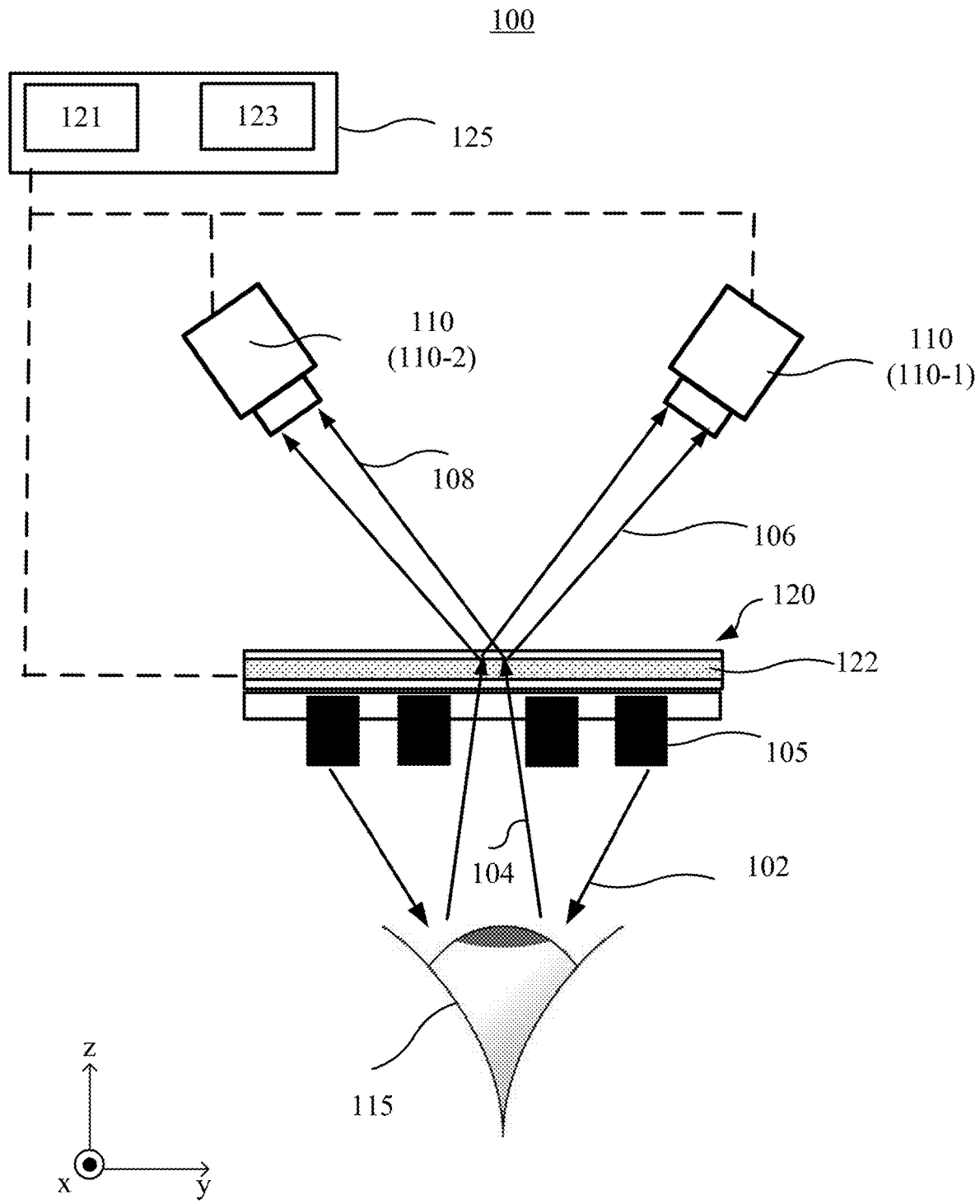
FIG. 1A illustrates a schematic diagram of an object tracking system, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable.

The phrases "in-plane direction," "in-plane orientation," "in-plane rotation," "in-plane alignment pattern," and "in-plane pitch" refer to a direction, an orientation, a rotation, an alignment pattern, and a pitch in a plane of a film or a layer (e.g., a surface plane of the film or layer, or a plane parallel to the surface plane of the film or layer), respectively. The term "out-of-plane direction" or "out-of-plane orientation" indicates a direction or orientation that is non-parallel to the plane of the film or layer (e.g., perpendicular to the surface plane of the film or layer, e.g., perpendicular to a plane parallel to the surface plane). For example, when an "in-plane" direction or orientation refers to a direction or orientation within a surface plane, an "out-of-plane" direction or orientation may refer to a thickness direction or orientation perpendicular to the surface plane, or a direction or orientation that is not parallel with the surface plane.

The term "orthogonal" as used in "orthogonal polarizations" or the term "orthogonally" as used in "orthogonally polarized" means that an inner product of two vectors representing the two polarizations is substantially zero. For example, two lights with orthogonal polarizations or two orthogonally polarized lights may be two linearly polarized lights with two orthogonal polarization directions (e.g., an x-axis direction and a y-axis direction in a Cartesian coordinate system) or two circularly polarized lights with opposite handednesses (e.g., a left handed circularly polarized light and a right handed circularly polarized light).

In the present disclosure, an angle of a beam (e.g., a diffraction angle of a diffracted beam or an incidence angle of an incident beam) with respect to a normal of a surface can be defined as a positive angle or a negative angle, depending on the angular relationship between a propagating direction of the beam and the normal of the surface. For example, when the propagating direction of the beam is clockwise from the normal, the angle of the propagating direction may be defined as a positive angle, and when the propagating direction of the beam is counter-clockwise from the normal, the angle of the propagating direction may be defined as a negative angle.

Various object tracking techniques have been demonstrated. For example, for eye tracking, a light source may emit an infrared ("IR") light to illuminate one or two eyes of a user. The IR light is not visible to the human eye and, thus, does not distract the user during operation. A light deflecting element such as a grating may be arranged facing the eye, and configured to deflect the IR light reflected by the eye to an optical sensor (or an imaging device), e.g., a camera. The optical sensor may be arranged off-axis with respect to the light deflecting element off-axis with respect to the eye (e.g., at a side of the eye, face, or user's head) to receive the deflected IR light, and generate a tracking signal based on the received IR light. Based on the tracking signal, the optical sensor may generate an image of the eye, which may be used to extract eye tracking information relating to the eye, such as gaze direction, movement direction, psychological state, etc. In conventional technologies, a single optical sensor (e.g., camera) arranged off-axis with respect to the eye has been used. The single optical sensor may generate a single tracking signal based on the IR light reflected from the eye and deflected by the light deflecting element. However, such a single tracking signal generated by the single optical sensor (e.g., camera) may provide insufficient information for determining accurate eye tracking information. For example, the accuracy in gaze tracking based on the single tracking signal may be poor.

In view of the limitations in the conventional technologies, the present disclosure provides an object tracking system with an enhanced tracking range and tracking accuracy. The system may split a tracking signal (e.g., a light reflected from an object that is tracked) into a plurality of signal lights temporally and/or spatially using a polarization selective optical element in combination with one or more other optical devices. Different signal lights may include different information of the tracked object, which may be used to provide an enhanced tracking range and tracking accuracy. Polarization selective optical elements, such as polarization selective lenses, gratings, and deflectors, etc., have gained increasing interests in optical device and system applications, e.g., in beam steering devices, waveguides, and displays. Polarization selective optical elements may be fabricated based on isotropic or anisotropic materials, and may include suitable sub-wavelength structures, a birefringent material (e.g., liquid crystals), a photo-refractive holographic material, or a combination thereof. Pancharatnam-Berry phase ("PBP") elements and polarization volume hologram ("PVH") elements are two types of polarization selective optical elements that provide a polarization selective optical response. A PBP element may modulate a circularly polarized light based on a phase profile provided through a geometric phase. A PVH element may modulate a circularly polarized light based on Bragg diffraction. An optic axis of a PVH element or a PBP element may have a spatially varying orientation in at least one in-plane direction. In some embodiments, an optic axis of a PVH element or a PBP element may also have a spatially varying orientation in an out-of-plane direction. PBP elements and PVH elements have features such as flatness, compactness, high efficiency, large bandwidth, high aperture ratios, absence of on-axis aberrations, switching capability, flexible design, simple fabrication, and low cost, etc. Thus, PBP elements and PVH elements can be implemented in various applications such as portable or wearable optical devices or systems. The term "optic axis" may refer to a direction in a crystal. A light propagating in the optic axis direction may not experience birefringence (or double refraction). An optic axis may be a direction rather than a single line: lights that are parallel to that direction may experience no birefringence.

The disclosed system may include a light source configured to emit a first light (e.g., an IR light) to illuminate an object (e.g., a pupil area of the eye, the entire eye, and/or an area near the eye, including the eye lid and/or the facial skins around the eye). The object may reflect the first light as a second light (also an IR light). The system may also include a polarization selective optical element ("PSOE") disposed adjacent (e.g., facing) the object and configured to deflect (e.g., diffract) the second light reflected from the object into a plurality of signal lights. At least two of the plurality of signal lights may have orthogonal polarizations. The polarization selective optical element may be a transmissive or a reflective optical element. That is, the polarization selective optical element may forwardly deflect (i.e., transmissive) or backwardly deflect (i.e., reflective) the second light. The system may also include at least one optical sensor configured to receive the signal lights output from the polarization selective optical element, and generate tracking signals relating to the object based on the received signal lights. In some embodiments, the at least one optical sensor may be disposed off-axis with respect to the object (e.g., at one or both sides of the object). In some embodiments, the light source may be omitted.

In some embodiments, the system may also include a polarization separator disposed between the at least one optical sensor and the PSOE. The polarization separator may be configured to separate the plurality of signal lights in a time multiplexing and/or a spatial multiplexing manner, such that the at least one optical sensor may receive the plurality of signal lights at different detecting regions (e.g., pixels) and/or during different time periods. In some embodiments, the polarization separator may include a wire grid polarizer configured to allow lights of different predetermined polarizations to pass through different portions of the wire grid polarizer. In some embodiments, the polarization separator may include a polarization selective beam steering assembly, e.g., a PBP grating assembly including a plurality of PBP gratings and a plurality of polarization switches (e.g., switchable half-wave plates) alternately arranged in a stack. In some embodiments, the polarization separator may include a combination of a waveplate (e.g., a quarter-wave plate), a polarization switch (e.g., a switchable half-wave plate), and a polarizer (e.g., an absorption linear polarizer). In some embodiments, the at least one optical sensor may include a plurality of optical sensors spaced apart from one another (e.g., arranged in an array), each configured to receive one of the plurality of signal lights.

In some embodiments, the polarization selective optical element may include one or more PBP elements (e.g., PBP gratings), a plurality of PVH elements (e.g., PVH gratings, or PVH lenses), or one or more volume Bragg gratings ("VBGs"). The PBP grating may be configured to operate in a positive state to forwardly diffract a first circularly polarized light with a first predetermined handedness in a positive diffraction angle, and operate in a negative state to forwardly diffract a second circularly polarized light having a second predetermined handedness opposite to the first predetermined handedness in a negative diffraction angle. The positive and negative diffraction angles may be defined relative to the normal of the surface of the grating. In some embodiments, the PBP grating may be configured to operate in a positive state for a first component of the second light reflected by the object. That is, the PBP grating may forwardly diffract the first component of the second light as a first signal light propagating in a positive diffraction angle. The PBP grating may operate in a negative state for a second component of the second light reflected by the object. That is, the PBP grating may forwardly diffract the second component of the second light as a second signal light propagating in a negative diffraction angle. Thus, the PBP grating may separate or split the second light reflected by the object into the first signal light and the second signal light propagating in different directions in space. In some embodiments, the first and second signal lights may have orthogonal polarizations. In some embodiments, the at least one optical sensor may include a first optical sensor and a second optical sensor configured to receive the first signal light and the second signal light, respectively.

A PVH element may be configured to substantially diffract (forwardly or backwardly) a first circularly polarized light with a predetermined handedness via Bragg diffraction, and substantially transmit (with negligible diffraction or no diffraction) a second circularly polarized light with a handedness opposite to the predetermined handedness. In some embodiments, the PVH element may be configured with no optical power, and hence may function as a grating (also referred to as a PVH grating). In some embodiments, the PVH element may be configured with an optical power, and hence may function as a lens (referred to as a PVH lens). In some embodiments, the PVH lens may be configured to converge or diverge a first circularly polarized light with a predetermined handedness in addition to diffracting the first circularly polarized light. In some embodiments, the PVH lens may substantially transmit (with negligible diffraction or no diffraction) a second circularly polarized light with a handedness opposite to the predetermined handedness. In other words, a PVH lens may be regarded as a PVH grating with an optical power.

In some embodiments, the polarization selective optical element may include a stack of a first PVH element (e.g., a first PVH lens) and a second PVH element (e.g., a second PVH lens) configured with opposite polarization selectivities. For example, the first PVH element (e.g., first PVH lens) may be configured to substantially backwardly diffract, via Bragg diffraction, a first component of the second light reflected by the object as a first signal light. The first PVH element may substantially transmit, with negligible diffraction or no diffraction, the second component of the second light reflected by the object toward the second PVH element (e.g., second PVH lens). The second PVH element (e.g., second PVH lens) may be configured to substantially backwardly diffract, via Bragg diffraction, the second component of the second light reflected by the object as a second signal light toward the first PVH element (e.g., first PVH lens). The first PVH element (e.g., a first PVH lens) may be configured to substantially transmit, with negligible diffraction or no diffraction, the second signal light output from the second PVH element (e.g., second PVH lens). In some embodiments, the first PVH element and the second PVH element may separate or split the second light reflected by the object into the first signal light and the second signal light propagating in different directions or in substantially the same direction in space. In some embodiments, the first and second signal lights may have orthogonal polarizations. In some embodiments, the least one optical sensor may include a first optical sensor and a second optical sensor configured to receive the first signal light and the second signal light, respectively. In some embodiments, the at least one optical sensor may include a single optical sensor configured to receive the first signal light and the second signal light at different detecting regions (or pixels) and/or during different time periods.

In some embodiments, the polarization selective optical element may also include a third PVH element (e.g., a third PVH lens) and a fourth PVH element (e.g., a fourth PVH lens) stacked with the first PVH element (e.g., first PVH lens) and the second PVH element (e.g., second PVH lens). The third PVH element and the fourth PVH element may be configured with opposite polarization selectivities. In some embodiments, the first PVH element and the second PVH element may be configured to operate in a first predetermined operating wavelength range, and the third PVH element and the fourth PVH element may be configured to operate in a second predetermined operating wavelength range.

Various object tracking system according to embodiments of the present disclosure will be discussed below. The object tracking systems may generate images based on lights reflected by an object (or target) that is being tracked, such as the eye or face of a user. For discussion purpose, the eye is used as an example of the object that is being tracked, and the object tracking systems are referred to as eye tracking systems in the following descriptions. The eye tracking system (or method) is described herein as an example of the object tracking system (or method). It is understood that the object tracking systems disclosed herein may be used to track a target or an object other than the eye of the user.

FIG. 1A schematically illustrates a y-z sectional view (e.g., a top view) of an object tracking system (e.g., eye tracking system) 100, according to an embodiment of the present disclosure. As shown in FIG. 1A, the eye tracking system 100 may include one or more light sources 105 configured to emit a light 102 to illuminate one or two eyes 115 of a person, such as a user of the eye tracking system. The light source 105 may be positioned out of a line of sight of the user (e.g., above and in front of the eye 115). FIG. 1A shows four light sources 105 and one eye 115 for illustrative purposes. It is understood that any suitable number of light sources 105 may be included, and components for tracking the eye 115 may be replicated for tracking the other eye of the user, which are omitted in FIG. 1A. In some embodiments, the light sources 105 may be omitted. In some embodiments, the light source 105 may emit the light 102 in the infrared ("IR") spectrum. For example, the spectrum of the light 102 emitted by the light source 105 may be within, overlap, or encompass at least a portion of the IR spectrum. In some embodiments, the light source 105 may emit the light 102 in the near infrared ("NIR") spectrum, or any other spectrum such that the light 102 is not visible by the eye 115. IR lights are not visible to the human eyes and thus, do not distract the user during operations. The light 102 emitted by the light source 105 may be reflected as a light 104, by a pupil area of the eye 115, the entire eye 115, an area near (e.g., above, below, left to, or right to) the eye 115, or an area including the eye 115 and the area near the eye 115, including the eye lid and/or the facial skins or other tissues around or inside the eye 115. For discussion purposes, the light reflected by such regions in or around the eye 115 is simply referred to as a light reflected by the eye 115.

The eye tracking system 100 may include a polarization selective optical element 120 disposed adjacent (e.g., facing) the eye 115 and configured to receive the light 104 reflected by the eye 115. The polarization selective optical element 120 may be configured to separate (or split) the light 104 into a plurality of signal lights, e.g., a first signal light 106 and a second signal light 108, in time and/or space. For example, the polarization selective optical element 120 may be configured to deflect, via a suitable mechanism, the light 104 as a plurality of signal lights, e.g., the first signal light 106 and a second signal light 108, which may propagate in different directions in space and/or in different time periods. The polarization selective optical element 120 may be configured to operate for a spectrum that includes at least a portion of the IR spectrum. In some embodiments, the polarization selective optical element 120 may be configured to operate for IR lights but not visible lights.

The eye tracking system 100 may also include one or more optical sensors 110 (e.g., a first optical sensor 110-1 and a second optical sensor 110-2 as shown in FIG. 1A) disposed at a side of the polarization selective optical element 120 opposite to the side where the eye 115 is located. The eye tracking system 100 may be configured to receive the plurality of signal lights, e.g., the first signal light 106 and the second signal light 108 output from the polarization selective optical element 120. The eye tracking system 100 may generate a plurality of signals or data based on the received signal lights for eye tracking (referred to as eye tracking signals, information, or data). The eye tracking system 100 may analyze or process the signal lights 106 and 108 to generate the eye tracking information. The one or more optical sensors 110 may be disposed obliquely with respect to the normal of the surface of the polarization selective optical element 120, or obliquely with respect to the line of sight of the eye 115. For example, the one or more optical sensors 110 may be disposed at locations that are off-axis with respect to the eye 115. The one or more optical sensors 110 may be positioned out of a line of sight of the user. The one or more optical sensors 110 may be configured to generate images based on lights having a wavelength within a predetermined wavelength range or spectrum that includes at least a portion of the IR spectrum. In some embodiments, the one or more optical sensors 110 may be configured to generate images based on IR lights but not visible lights. In some embodiments, the one or more optical sensors 110 may include a camera, or a photodiode, etc., such as one or more of a charge-coupled device ("CCD") camera, a complementary metal-oxide-semiconductor ("CMOS") sensor, an N-type metal-oxide-semiconductor ("NMOS") sensor, a pixelated polarized camera, or any other optical sensors. In some embodiments, the optical sensor 110 may also be referred to as an imaging device.

In some embodiments, each of the one or more optical sensors 110 may include a processor configured to process the received signal lights, such as the first signal light 106 and the second signal light 108, to generate an image of the eye 115. In some embodiments, each of the one or more optical sensors 110 may further analyze the generated image of the eye 115 to obtain information that may be used for eye tracking and other purposes, such as for determining what information to present to the user, for configuring the layout of the presentation of the information, for addressing vergence-accommodation conflict, etc. In some embodiments, each of the one or more optical sensors 110 may also include a non-transitory computer-readable storage medium (e.g., a computer-readable memory) configured to store data, such as the generated images. In some embodiments, the non-transitory computer-readable storage medium may store codes or instructions that may be executable by the processor to perform various steps of any methods disclosed herein.

In some embodiments, the processor and the non-transitory computer-readable medium may be provided separately from the each of the one or more optical sensors 110. For example, the eye tracking system 100 may include a controller 125 communicatively connected with the one or more optical sensors 110 (e.g., the first optical sensor 110-1 and the second optical sensor 110-2 shown in FIG. 1A) and configured to receive data from the one or more optical sensors 110. The controller 125 may include a processor or processing unit 121 and a storage device 123. The processor 121 may by any suitable processor, such as a central processing unit ("CPU"), a graphic processing unit ("GPU"), etc. The storage device 123 may be a non-transitory computer-readable medium, such as a memory, a hard disk, etc. The storage device 123 may be configured to store data or information, including computer-executable program instructions or codes, which may be executed by the processor 121 to perform various controls or functions of the methods or processes disclosed herein. For example, the controller 125 may be configured to analyze the data (e.g., signals) received from the optical sensor 110 to obtain information for eye tracking or other purposes. In some embodiments, the controller 125 may be implemented in each of the optical sensors 110-1 and 110-2.

In the embodiment shown in FIG. 1A, for illustrative purposes, two optical sensors 110-1 and 110-2 are shown. The two optical sensors 110-1 and 110-2 are shown as being disposed apart from one another on a side of the polarization selective optical element 120 opposite to the side where the eye 115 is located. The eye tracking system 100 may be referred to as a dual-camera eye tracking system. The polarization selective optical element 120 may be a transmissive polarization selective optical element, which is configured to forwardly diffract the light 104 reflected by the eye 115 as the first signal light 106 propagating in a first direction toward the first optical sensor 110-1 and the second signal light 108 propagating in a second direction toward the second optical sensor 110-2. The first direction may be substantially different from the second direction. In some embodiments, the first signal light 106 and the second signal light 108 may be diffracted lights of different diffraction orders, e.g., $+1^{st}$ order and $-1^{st}$ order. In some embodiments, the first signal light 106 and the second signal light 108 may be diffracted lights having opposite diffraction angles. For example, one of the first signal light 106 and the second signal light 108 may have a positive diffraction angle, and the other of the first signal light 106 and the second signal light 108 may have a negative diffraction angle. In some embodiments, the first signal light 106 and the second signal light 108 may be orthogonally polarized lights. In some embodiments, the polarization selective optical element 120 may be an active element, which may be controlled by a voltage provided by a power source (not shown). In some embodiments, the controller 125 may be communicatively connected with the polarization selective optical element 120 to control an operation of the polarization selective optical element 120. In some embodiments, the polarization selective optical element 120 may be a passive element.

In some embodiments, the first optical sensor 110-1 and the second optical sensor 110-2 may be positioned with suitable orientations or directions to receive the first signal light 106 and the second signal light 108, respectively. The first optical sensor 110-1 and the second optical sensor 110-2 may be configured to generate signals, data, or information based on the first signal light 106 and the second signal light 108, respectively, which may be used for eye tracking and/or face tracking. In some embodiments, multiple images of the eye 115 may be generated by the first and second optical sensors 110-1 and 110-2 based on the first signal light 106 and the second signal light 108, respectively, thereby providing multiple perspective views of the eye 115. For example, a first perceptive view of the eye 115 may be obtained from a first image generated based on the first signal light 106 received by the first optical sensor 110-1, and a second perceptive view of the eye 115 may be obtained from a second image generated based on the second signal light 108 received by the second optical sensor 110-2. Compared to single view or single signal eye tracking, additional eye tracking information may be extracted from the first signal light 106 and the second signal light 108 respectively received by the optical sensors 110-1 and 110-2, thereby improving the accuracy of eye tracking, which may increase the accuracy of eye tracking, especially when the eye 115 moves. Thus, the disclosed eye tracking system 100 may provide enhanced user experience. In addition, through the dual cameras, e.g., the first optical sensor 110-1 and the second optical sensor 110-2, the tracking range of the eye tracking system 100 may be increased. For example, the eye tracking system 100 may track the movement of the eyes in larger movement ranges in the horizontal and/or vertical directions.

In some embodiments, the polarization selective optical element 120 may include one or more PBP elements 122 arranged in an optical series. In some embodiments, the one or more PBP elements 122 may be configured to operate for lights having different wavelength ranges. In some embodiments, the one or more PBP elements 122 may be configured to operate for lights having different incidence angles. For illustrative purposes, FIG. 1A shows one PBP element 122. In some embodiments, the PBP element 122 may be a PBP grating (e.g., a transmissive PBP grating 122) configured to operate in a positive state for a circularly polarized light having a predetermined handedness, and operate in a negative state for a circularly polarized light having a handedness opposite to the predetermined handedness. In some embodiments, the polarization selective optical element 120 may include a plurality of PBP gratings 122 arranged in an optical series. In some embodiments, the plurality of PBP gratings 122 may be configured with a same polarization selectivity, e.g., each PBP grating 122 may be configured to operate in a positive state for a circularly polarized light having a first handedness, and operate in a negative state for a circularly polarized light having a second handedness opposite to the first handedness. The PBP grating 122 operating in the positive state may be configured to forwardly diffract the circularly polarized light having the first handedness to a positive diffraction angle. The PBP grating 122 operating in the negative state may be configured to forwardly diffract the circularly polarized light having the second handedness to a negative diffraction angle. In addition, the PBP grating 122 operating in the positive state or negative state may be configured to reverse a handedness of a circularly polarized light while diffracting the circularly polarized light. For example, the PBP grating 122 may diffract a right-handed circularly polarized ("RHCP") light as a left-handed circularly polarized ("LHCP") light, and diffract an LHCP light as an RHCP light.

For discussion purposes, in FIG. 1A, the light 102 output from the light source 105 or the light 104 reflected by the eye 115 may include an RHCP component and an LHCP component. For discussion purposes, the PBP grating 122 may be a right-handed PBP grating configured to operate in a positive state for an RHCP light, and to operate in a negative state for an LHCP light. Thus, the PBP grating 122 may forwardly diffract the RHCP component of the light 104 as the first signal light (e.g., LHCP light) 106 having a positive diffraction angle, and forwardly diffract the LHCP component of the light 104 as the second signal light 108 (e.g., RHCP light) having a negative diffraction angle. That is, the diffracted signal lights 106 and 108 may be circularly polarized lights having opposite handednesses. In some embodiments, the first signal light 106 may be a diffracted light of the $+1^{st}$ diffraction order, and the second signal light 108 may be a diffracted light of the $-1^{st}$ diffraction order. Thus, the PBP grating 122 may split or separate the light 104 reflected by the eye 115 as the first signal light 106 and the second signal light 108 carrying different tracking information of the eye 115.

Figure 1B:
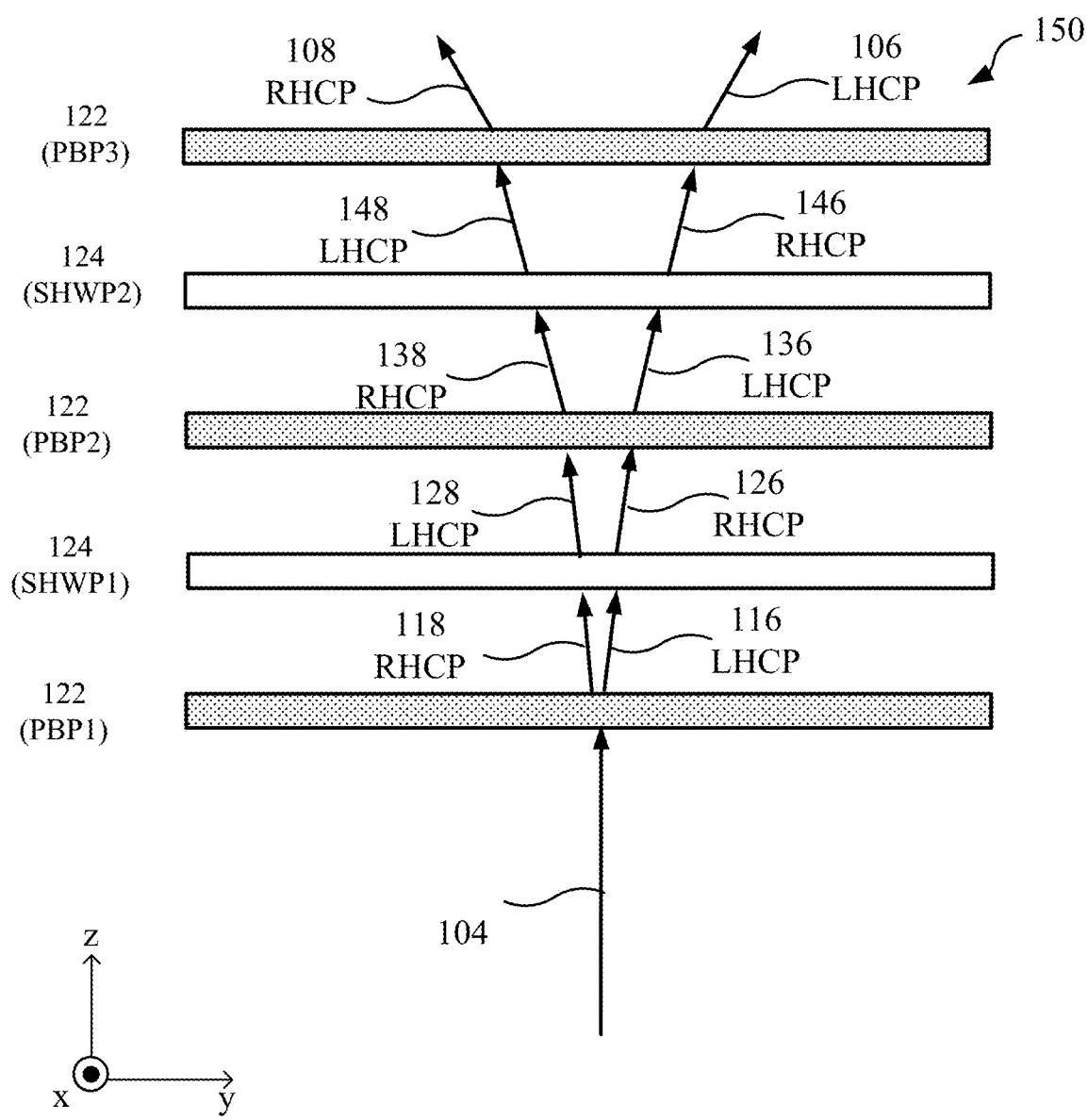
FIG. 1B illustrates a schematic diagram of a polarization selective optical element that may be included in the object tracking system shown in FIG. 1A, according to an embodiment of the present disclosure.

In some embodiments, the polarization selective optical element 120 may also include one or more polarization switches, e.g., one or more switchable half-wave plates ("SHWPs"). The PBP gratings 122 and the SHWPs may be alternately arranged. An SHWP disposed before a corresponding PBP grating 122 in an optical series may be configured to control an optical state of the corresponding PBP grating 122. FIG. 1B illustrates a schematic diagram of a polarization selective optical element 150 that may be included in the system 100 shown in FIG. 1A, according to an embodiment of the present disclosure. The polarization selective optical element 150 may be an embodiment of the polarization selective optical element 120 shown in FIG. 1A.

As shown in FIG. 1B, the polarization selective optical element 150 may include a plurality of PBP elements (e.g., PBP gratings) 122 and a plurality of SHWPs 124 alternately arranged. For illustrative purposes, FIG. 1B shows that the polarization selective optical element 150 may include two SHWPs 124 (SHWP1 and SHWP2), and three PBP gratings 122 (PBP1, PBP2, and PBP3). The SHWP 124 may be an active element configured to be switchable between a switching state and a non-switching state. A controller (e.g., the controller 125 shown in FIG. 1A) may be configured to control a voltage supply by a power source (not shown) to the SHWP 124, thereby configuring the SHWP 124 to operate in the switching state or the non-switching state. The SHWP 124 operating in the switching state may be configured to convert the polarization of a polarized input light from a first polarization to a second polarization different from (e.g., orthogonal to) the first polarization, while transmitting the polarized input light therethrough to a downstream PBP element in the light propagation direction. The SHWP 124 operating in the non-switching state may be configured to substantially maintain the polarization of a polarized input light, while transmitting the polarized input light therethrough to a downstream PBP element in the light propagation direction. As the optical state (e.g., a positive state or a negative state) of the PBP grating 122 is determined by the handedness of a circularly polarized incident light, the SHWP 124 disposed before the PBP grating 122 in an optical series may control whether the PBP grating 122 operates in the positive state or the negative state through controlling the handedness of the circularly polarized light incident onto the PBP grating 122.

FIG. 1B shows that the polarization selective optical element 150 diffracts the RHCP component and the LHCP component of the light 104 reflected from the eye in opposite diffraction angles. For illustrative purposes, the PBP gratings 122 (PBP 1 to PBP3) are presumed to be right-handed PBP gratings. The RHCP component and the LHCP component of the light 104 may be diffracted by the PBP1 as an LHCP light 116 at a first positive angle (e.g., +θ1) and an RHCP light 118 at a first negative angle (e.g., −θ1), respectively, which are received by the SHWP1. Here, the diffraction angle is defined to be positive when the diffracted light is clockwise relative to the normal of the light exiting surface of a PBP grating, and negative when the diffracted light is counter-clockwise relative to the normal of the light exiting surface of a PBP grating. The SHWP1 may be configured to operate in a switching state to convert the LHCP light 116 and RHCP light 118 into an RHCP light 126 and an LHCP light 128, respectively. The RHCP light 126 and the LHCP light 128 may be diffracted by the PBP2 as an LHCP light 136 at a second positive angle (e.g., +(θ1+θ2)) and as an RHCP light 138 at a second negative angle (e.g., −(θ1+θ2)), respectively, which may be received by the SHWP2. The SHWP2 may be configured to operate in a switching state to convert the LHCP light 136 and RHCP light 138 into an RHCP light 146 and an LHCP light 148, respectively. The RHCP light 146 and the LHCP light 148 may be diffracted by the PBP3 as the LHCP light 106 at a third positive angle (e.g., +(θ1+θ2+θ3)) and as the RHCP light 108 at a third negative angle (e.g., −(θ1+θ2+θ3)), respectively.

Figure 2A:
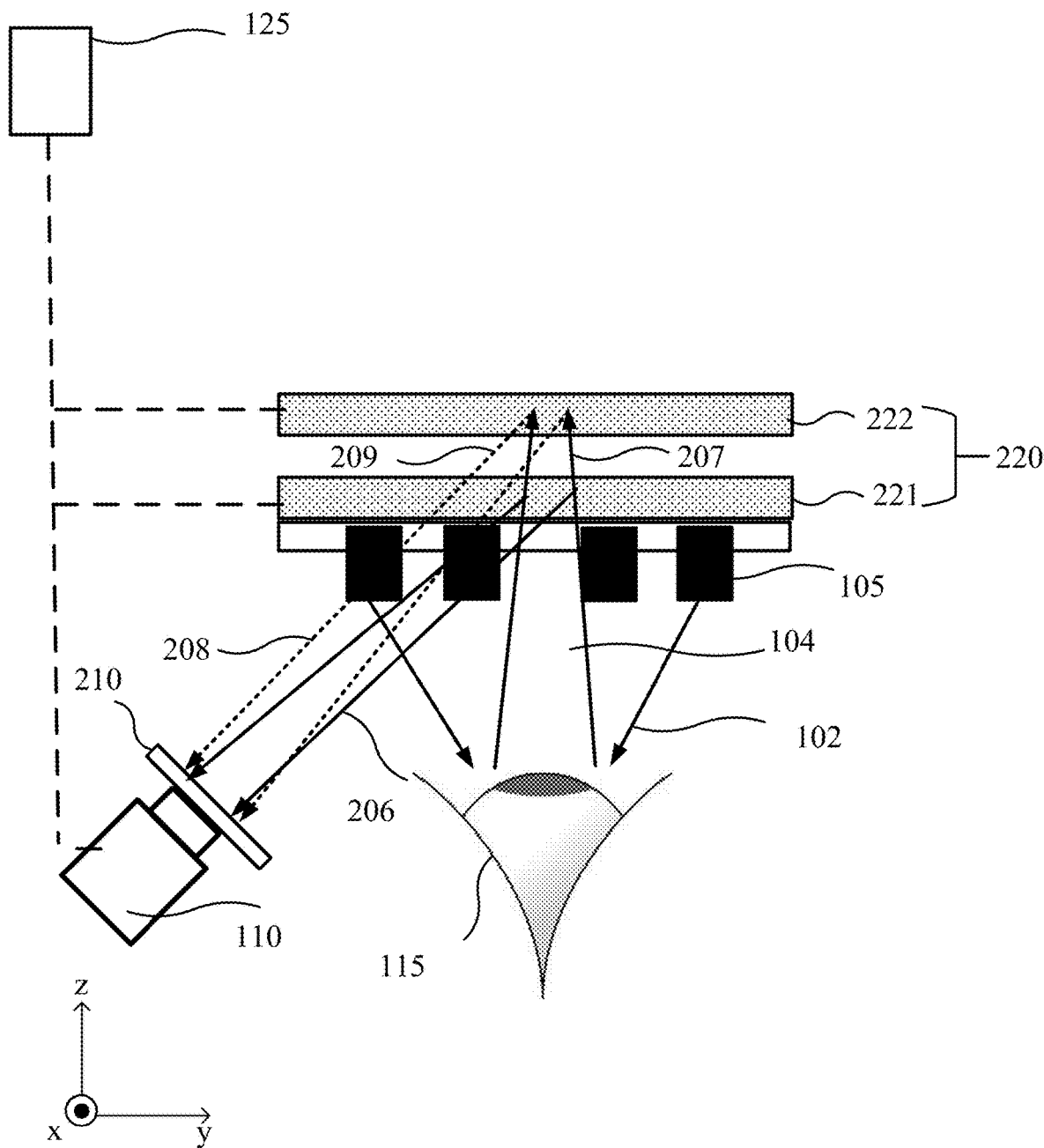
FIG. 2A illustrates a schematic diagram of an object tracking system, according to an embodiment of the present disclosure.

FIG. 2A illustrates a y-z sectional view (e.g., a top view) of an object tracking system (e.g., eye tracking system) 200, according to an embodiment of the present disclosure. The eye tracking system 200 may include elements, structures, and/or functions that are the same as or similar to those included in the system 100 shown in FIGS. 1A and 1B. Detailed descriptions of the same or similar elements, structures, and/or functions may refer to the above descriptions rendered in connection with FIGS. 1A and 1B. As shown in FIG. 2A, the eye tracking system 200 may include one or more light sources 105, a polarization selective optical element 220, and one or more optical sensors 110. The one or more light sources 105 may be configured to emit the light 102 to illuminate one or two eyes 115 of a user. The eye 115 may reflect the light 102 as the light 104 propagating toward the polarization selective optical element 220. The polarization selective optical element 220 may be configured to split (e.g., deflect) the light 104 reflected by the eye 115 as a plurality of signal lights, e.g., a first signal light 206 and a second signal light 208, propagating towards the one or more optical sensors 110.

In the embodiment shown in FIG. 2A, a single optical sensor 110 is included. The optical sensor 110 may be configured to receive the signal lights 206 and 208, which may be output by the polarization selective optical element 220. The eye tracking system 200 may be referred to as a single camera eye tracking system. The optical sensor 110 may be disposed on the same side of the polarization selective optical element 220 as the eye 115. The optical sensor 110 may obliquely face the polarization selective optical element 220. The polarization selective optical element 220 may be a reflective polarization selective optical element.

In some embodiments, the polarization selective optical element 220 may be configured to backwardly diffract the light 104 reflected by the eye 115 as the first signal light 206 and the second signal light 208 propagating toward the optical sensor 110. The first signal light 206 and the second signal light 208 may propagate toward the optical sensor 110 in a substantially same direction or slightly different directions. In some embodiments, the first signal light 206 and the second signal light 208 may be orthogonally polarized lights. In some embodiments, the first signal light 206 and the second signal light 208 may be diffracted lights of different diffraction orders. In some embodiments, the first signal light 206 and the second signal light 208 may be diffracted lights having diffraction angles of the same sign. For example, both the first signal light 206 and the second signal light 208 may have positive or negative diffraction angles. For illustrative purposes, FIG. 2A shows that both the first signal light 206 and the second signal light 208 may have positive diffraction angles (e.g., clockwise from the light exiting surface of the polarization selective optical element 220). The optical sensor 110 may be configured to generate signals, data, or information based on the first signal light 206 and the second signal light 208, respectively. In some embodiments, multiple images of the eye 115 may be generated by the optical sensor 110 based on the first signal light 206 and the second signal light 208, respectively, thereby providing multiple perspective views of the eye 115. Thus, additional eye tracking information may be extracted from the signal lights 206 and 208, which may increase the accuracy of eye tracking. The system 200 may provide larger tracking ranges when the eye 115 moves in the horizontal and/or vertical directions. The system 200 may provide an enhanced user experience.

In some embodiments, the polarization selective optical element 220 may include a plurality of PVH elements (e.g., a first PVH element 221 and a second PVH element 222) arranged in an optical series. A PVH element may be configured to substantially diffract a circularly polarized light having a predetermined handedness, and substantially transmit a circularly polarized light having a handedness opposite to the predetermined handedness with negligible diffraction or no diffraction. For example, a left-handed PVH element may be configured to substantially diffract an LHCP light, and substantially transmit an RHCP light with negligible diffraction or no diffraction. A right-handed PVH element may be configured to substantially diffract an RHCP light, and substantially transmit an LHCP light with negligible diffraction or no diffraction. At least two of the PVH elements included in the polarization selective optical element 220 may be configured to have different polarization selectivities.

For discussion purposes, FIG. 2A shows that the polarization selective optical element 220 includes two reflective PVH elements arranged in an optical series, the first PVH element 221 and the second PVH element 222. A reflective PVH element may be configured to substantially backwardly diffract a circularly polarized light having a predetermined handedness, and substantially transmit a circularly polarized light having a handedness opposite to the predetermined handedness with negligible diffraction or no diffraction. In addition, a reflective PVH element may be configured to substantially maintain the polarization of the diffracted light and the transmitted light. For discussion purposes, in FIG. 2A, the light 102 output from the light source 105 or the light 104 reflected by the eye 115 may include two orthogonally polarized components, e.g., an RHCP component and an LHCP component. The first PVH element 221 and the second PVH element 222 may be configured with different polarization selectivities. For example, one of the first PVH element 221 and the second PVH element 222 may be configured to substantially backwardly diffract the RHCP (or LHCP) component of the light 104, and substantially transmit the LHCP (or RHCP) component with negligible diffraction or no diffraction. The other one of the first PVH element 221 and the second PVH element 222 may be configured to substantially backwardly diffract the LHCP (or RHCP) component of the light 104, and substantially transmit the RHCP (or LHCP) component with negligible diffraction or no diffraction.

For discussion purposes, in FIG. 2A, the first PVH element 221 may be a right-handed PVH lens, and the second PVH element 222 may be a left-handed PVH lens. A PVH lens may provide a large field of view. Although not shown, in some embodiments, the first PVH element 221 and the second PVH element 222 may be PVH gratings. In some embodiments, one of the first PVH element 221 and the second PVH element 222 may be a PVH grating, and the other of the first PVH element 221 and the second PVH element 222 may be a PVH lens. The first PVH element (e.g., right-handed PVH lens) 221 may be configured to substantially backwardly diffract and converge or diverge the RHCP component of the light 104 as the first signal light (e.g., RHCP light) 206 propagating toward the optical sensor 110, and substantially transmit, with negligible diffraction or no diffraction, the LHCP component of the light 104 as a light (e.g., an LHCP light) 207 propagating toward the second PVH element (e.g., left-handed PVH lens) 222. The second PVH element (e.g., left-handed PVH lens) 222 may be configured to substantially backwardly diffract and converge or diverge the light (e.g., LHCP light) 207 as a light (e.g., an LHCP light) 209 propagating toward the first PVH element (e.g., right-handed PVH lens) 221. The first PVH (e.g., right-handed PVH lens) 221 may substantially transmit, with negligible diffraction or no diffraction, the light (e.g., LHCP light) 209 as the second signal light (e.g., LHCP light) 208 propagating toward the optical sensor 110. That is, the first PVH element 221 and the second PVH element 222 may split, via diffraction, the light 104 reflected by the eye 115, into the first signal light (e.g., RHCP light) 206 and the second signal light (e.g., LHCP light) 208 with orthogonal polarizations.

In some embodiments, the optical sensor 110 may be configured to receive the first signal light (e.g., RHCP light) 206 and the second signal light (e.g., LHCP light) 208 in a time multiplexing manner and/or a spatial multiplexing manner. The optical sensor 110 may generate different tracking signals based on the received signal lights. In some embodiments, the eye tracking system 200 may include a polarization separator 210 disposed in front of the optical sensor 110, for separating the first signal light 206 from the second signal light 208 in space and/or in time.

In some embodiments, in addition to splitting the light 104 reflected by the eye 115 into the first signal light 206 and the second signal light 208 with orthogonal polarizations, the first PVH element 221 and the second PVH element 222 may also be configured to function as corrective lenses to correct optical aberrations. Thus, the camera optics (e.g., an optical system used in the optical sensor 110 for detecting and/or imaging) may be simplified, and the quality of the tracking signals generated by the optical sensor 110 may be enhanced.

Figure 2B:
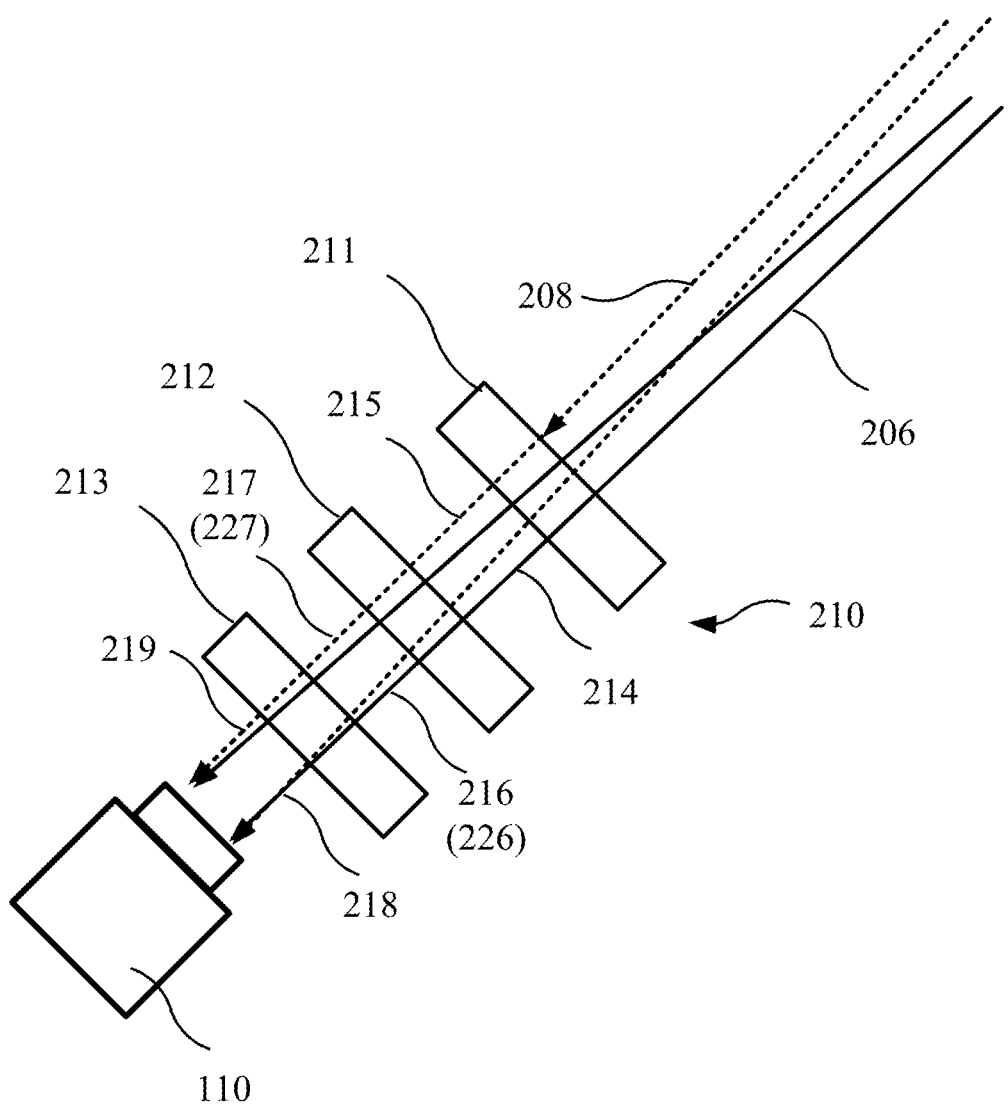
FIG. 2B illustrates a schematic diagram of a polarization separator that may be included in the object tracking system shown in FIG. 2A, according to an embodiment of the present disclosure.

FIG. 2B illustrates a schematic diagram of the polarization separator 210, according to an embodiment of the present disclosure. As shown in FIG. 2B, the polarization separator 210 may include a waveplate 211, a polarization switch 212, and a polarizer 213 arranged in an optical series. In some embodiments, the waveplate 211 may function as a quarter-wave plate ("QWP") configured to convert a circularly polarized light to a linearly polarized light and vice versa for lights within an IR spectrum. The polarization switch 122 may be an active element controllable to operate between a switching state and a non-switching state. A controller (e.g., the controller 125 shown in FIG. 2A) may be configured to control a voltage supply from a power source to the polarization switch 212, thereby controlling the polarization switch 212 to operate in the switching state or the non-switching state. The polarization switch 212 operating in the switching state may be configured to convert the polarization of a polarized input light from a first polarization to a second polarization different from (e.g., orthogonal to) the first polarization, while transmitting the polarized input light therethrough. The polarization switch 212 operating in the non-switching state may be configured to substantially maintain the polarization of the polarized input light, while transmitting the polarized input light therethrough. In some embodiments, the polarization switch 122 may include an SHWP similar to the SHWP 124 shown in FIG. 1B, or a 90° twist-nematic liquid crystal ("TNLC") cell.

The polarizer 213 may be disposed between the polarization switch 212 and the optical sensor 110. The polarization switch 212 may be disposed between the waveplate 211 and the polarizer 213. In some embodiments, the polarizer 213 may be a linear polarizer configured to substantially transmit a linearly polarized light having a polarization direction along a transmission axis of the polarizer 213, and substantially block, via absorption, a linearly polarized light having a polarization direction perpendicular to the transmission axis of the polarizer 213. The configuration of the waveplate 211, the polarization switch 212, and the polarizer 213 is merely one example. These elements may be arranged in other configurations. For example, in some embodiments, the waveplate 211 may be disposed between the polarization switch 212 and the polarizer 213.

As shown in FIG. 2B, the waveplate (e.g., a QWP) 211 may be configured to convert the first signal light (e.g., RHCP light) 206 to a linearly polarized light 214 having a first polarization (e.g., an s-polarized light), and convert the second signal light (e.g., LHCP light) 208 to a linearly polarized light 215 having a second polarization (e.g., a p-polarized light) orthogonal to the first polarization. During a first time period, the polarization switch 212 may operate in the switching state to convert the linearly polarized light 214 having the first polarization (e.g., s-polarization) to a linearly polarized light 216 having the second polarization (e.g., p-polarization), and convert the linearly polarized light 215 having the second polarization (e.g., p-polarization) to a linearly polarized light 217 having the first polarization (e.g., s-polarization). For discussion purposes, the polarizer 213 may be a linear polarizer configured to substantially transmit a linearly polarized light having the first polarization (e.g., s-polarization), and substantially block a linearly polarized light having the second polarization (e.g., p-polarization). Thus, the polarizer 213 may substantially transmit the linearly polarized light 217 having the first polarization (e.g., s-polarization), and substantially block, via absorption, the linearly polarized light 216 having the second polarization (e.g., p-polarization). For example, the polarizer 213 may substantially transmit the linearly polarized light 217 having the first polarization (e.g., s-polarization) as a linearly polarized light 219 having the first polarization (e.g., s-polarization). The optical sensor 110 may receive the linearly polarized light 219 output from the polarizer 213.

During a second time period, the polarization switch 212 may operate in the non-switching state to substantially maintain the polarizations of the linearly polarized light 214 having the first polarization (e.g., s-polarization) and the linearly polarized light 215 having the second polarization (e.g., p-polarization). For example, the polarization switch 212 may transmit the linearly polarized light 214 having the first polarization (e.g., s-polarization) as a linearly polarized light 226 having the first polarization (e.g., s-polarization), and transmit the linearly polarized light 215 having the second polarization (e.g., p-polarization) as a linearly polarized light 227 having the second polarization (e.g., p-polarization). As the polarizer 213 substantially transmits a linearly polarized light having the first polarization (e.g., s-polarization) and substantially blocks a linearly polarized light having the second polarization (e.g., p-polarization), the linearly polarized light 226 having the first polarization (e.g., s-polarization) may substantially transmitted through the polarizer 213 as a linearly polarized light 218 having the first polarization (e.g., s-polarization), and the linearly polarized light 227 having the second polarization (e.g., p-polarization) may be substantially blocked by the polarizer 213 via absorption. The optical sensor 110 may receive the linearly polarized light 218 output from the polarizer 213.

Thus, when the polarization switch 212 operates in the switching state, the light received by the optical sensor 110 may be substantially the linearly polarized light 219 (e.g., an s-polarized light) converted from the second signal light (e.g., LHCP light) 208, and the linearly polarized light 218 converted from the first signal light (e.g., RHCP light) 206 may not be received by the optical sensor 110. When the polarization switch 212 operates in the non-switching state, the light received by the optical sensor 110 may be substantially the linearly polarized light (e.g., an s-polarized light) 218 converted from the first signal light (e.g., RHCP light) 206, and the linearly polarized light 219 (e.g., an s-polarized light) converted from the second signal light (e.g., LHCP light) 208 may not be received by the optical sensor 110. That is, through switching the polarization switch 212 between the switching state and the non-switching state, at the first time period, the optical sensor 110 may primarily receive the linearly polarized light 219 (e.g., an s-polarized light) converted from the second signal light (e.g., LHCP light) 208, and at the second time period, the optical sensor 110 may primarily receive linearly polarized light 218 converted from the first signal light (e.g., RHCP light) 206. In other words, the combination of the waveplate (e.g., a QWP) 211, the polarization switch 212, and the polarizer 213 may be configured to alternately transmit the first signal light (e.g., RHCP light) 206 and the second signal light (e.g., LHCP light) 208 toward the optical sensor 110, in a time multiplexing manner. The optical sensor 110 may generate different images of the eye 115 respectively based on the first signal light (e.g., RHCP light) 206 and the second signal light (e.g., LHCP light) 208 separately received in the time multiplexing manner, enabling a time multiplexing multi-view eye tracking. For example, a first perceptive view of the eye 115 may be obtained from a first image generated based on the first signal light (e.g., RHCP light) 206, and a second perceptive view of the eye 115 may be obtained from a second image generated based on the second signal light (e.g., LHCP light) 208. Compared to conventional eye tracking based on a single view or single signal, more information relating to the eye 115 may be extracted from the light reflected by the eye 115, thereby improving the accuracy of eye tracking.

Figure 2C:
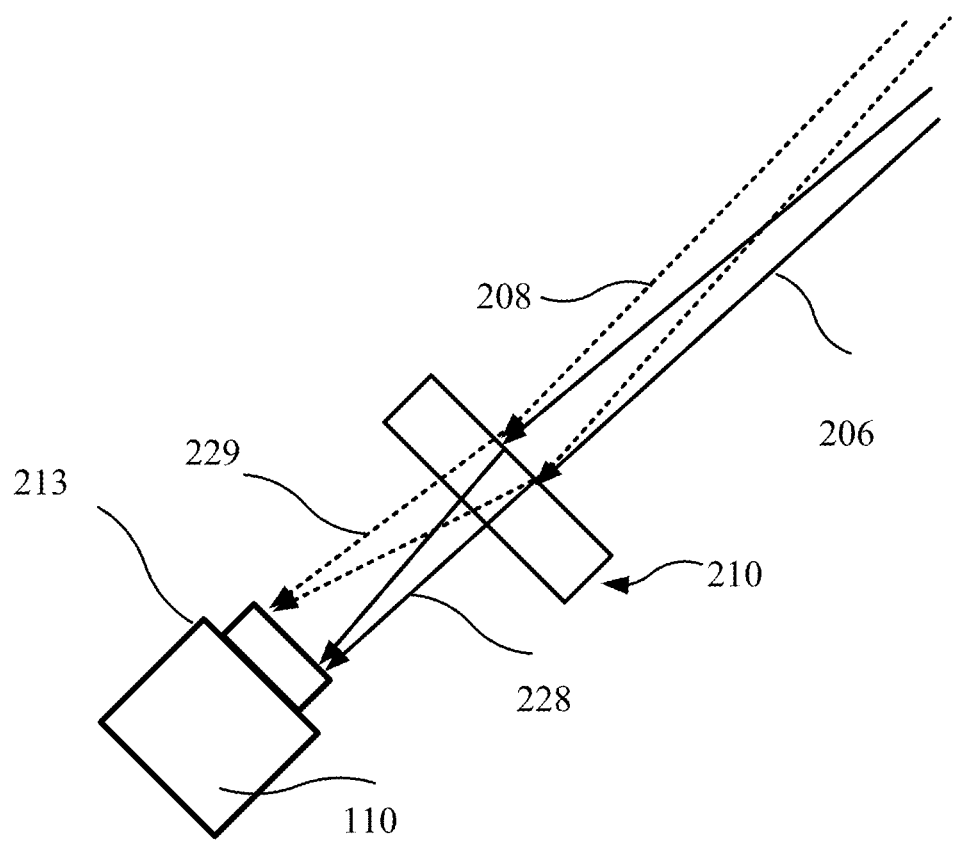
FIG. 2C illustrates a schematic diagram of a polarization separator that may be included in the object tracking system shown in FIG. 2A, according to an embodiment of the present disclosure.

FIG. 2C illustrates a schematic diagram of another example of the polarization separator 210, according to an embodiment of the present disclosure. As shown in FIG. 2C, the polarization separator 210 may include a polarization selective steering assembly (also referred to as 210 for discussion purposes) for providing a spatial multiplexing multi-view eye tracking. For example, the polarization selective steering assembly 210 may be configured to steer input lights of different polarizations to different angles (or directions), such that the steered lights may propagate toward different detecting regions of the optical sensor 110. The distance between the different detecting regions may be sufficiently large to be recognized by the optical sensor 110. For example, the distance between the different regions may be larger than or equal to the smallest distance that may be recognized by the optical sensor 110. In some embodiments, the optical sensor 110 may generate separate images (e.g., different perspective views) based on the lights received at different detecting regions. In some embodiments, the optical sensor 110 may generate a single image based on the lights received at different detecting regions within a same time period. The single image may be processed to extract different perspective views of the eye 115. Thus, different perspective views of the eye 115 may be provided by the optical sensor 110. Accordingly, the tracking accuracy may be enhanced.

For example, as shown in FIG. 2C, the polarization selective steering assembly 210 may steer the first signal light (e.g., RHCP light) 206 as a light 228 in a first steering angle, and steer the second signal light (e.g., LHCP light) 208 as a light 229 in a second steering angle different from the first steering angle. In some embodiments, the steering angle difference between the light 228 and the light 229 and/or the distance between the optical sensor 110 and the polarization selective steering assembly 210 may be configured, such that the light 228 and the light 229 may be received by different detecting regions of the optical sensor 110. In some embodiments, the optical sensor 110 may provide multiple perspective views of the eye 115 based on the received light 228 and light 229, thereby enhancing the eye-tracking accuracy. In some embodiments, the polarization selective steering assembly 210 may include at least one liquid crystal ("LC") steering element configured to steer the input lights of different polarizations in different angles (or directions), such as an optical phased array ("OPA"), a switchable Bragg grating, an index matched surface relief grating, or a PBP grating, etc. In some embodiments, the polarization selective steering assembly 210 may be similar to the polarization selective optical element 150 shown in FIG. 1B. In some embodiments, the polarization selective steering assembly 210 may include two LC steering elements configured to steer an input beam over two axes. In some embodiments, the polarization selective steering assembly 210 may include a metasurface steering element.

In some embodiments, the optical sensor 110 may include a pixelated polarized camera, which may be configured to receive the first signal light 206 and the second signal light 208 at different detecting regions (e.g., pixels). In some embodiments, the polarization separator 210 may include a waveplate (e.g., a QWP) (also referred to as 210) configured to convert a circularly polarized light to a linearly polarized light and vice versa for lights within an IR spectrum. For example, the QWP 210 may be configured to convert the first signal light (e.g., RHCP light) 206 and the second signal light (e.g., LHCP light) 208 into two linearly polarized light having orthogonal polarizations, respectively, which may be received by different detecting regions (e.g., pixels) of the pixelated polarized camera.

Figure 2D:
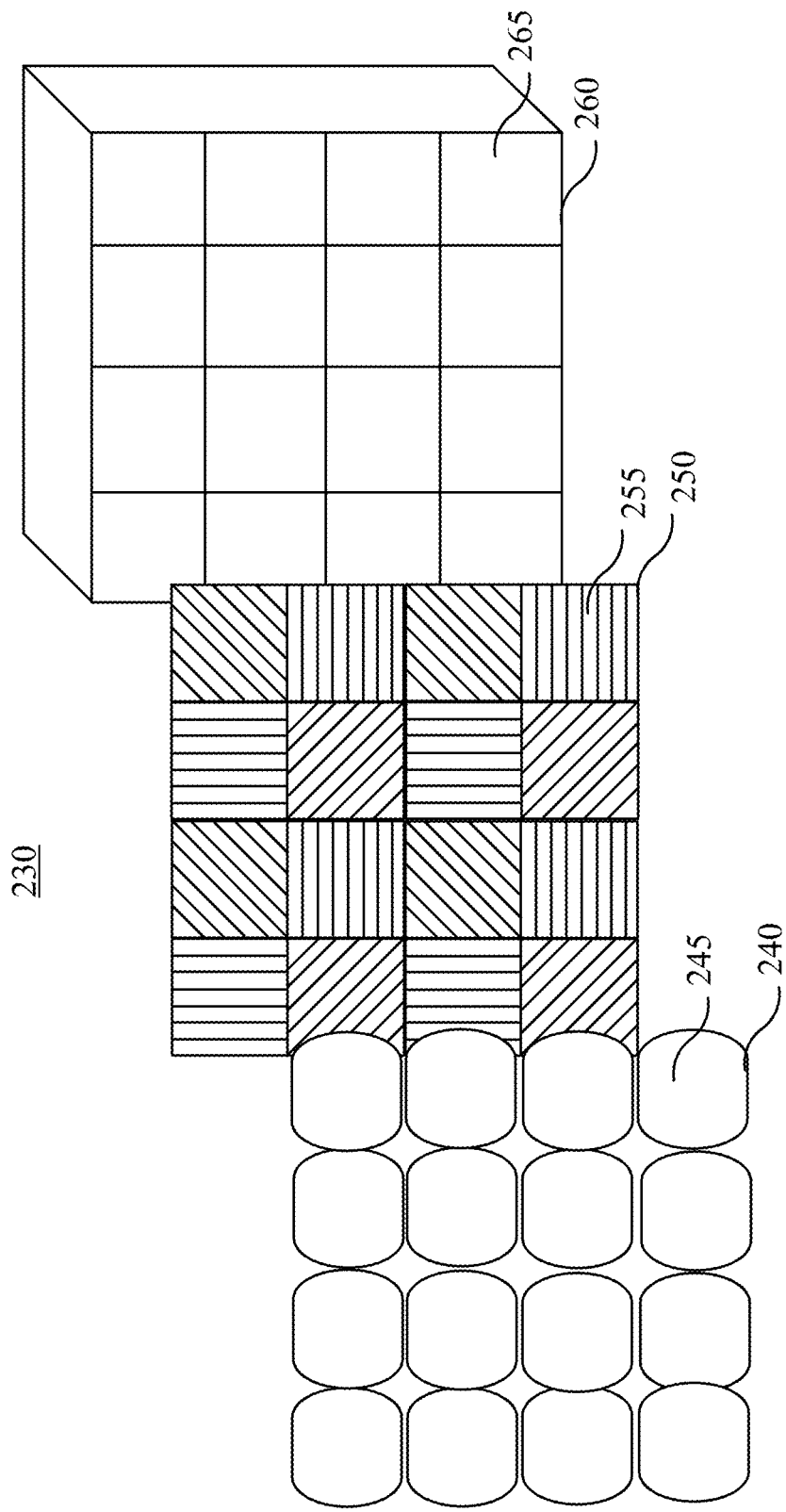
FIG. 2D illustrates an exploded view of a schematic structure of a pixelated polarized imaging device that may be included in the object tracking system shown in FIG. 2A, according to an embodiment of the present disclosure.

FIG. 2D illustrates an exploded view of a schematic structure of a pixelated polarized camera 230 that may be included in the optical sensor 110, according to an embodiment of the present disclosure. The pixelated polarized camera 230 may be configured for an IR spectrum. As shown in FIG. 2D, the pixelated polarized camera 230 may include an on-chip micro-lens array 240, a pixel-level micro-polarizer array 250, and a photo diode array 260 aligned and stacked together. The on-chip micro-lens array 240 may include a plurality of lenses 245 arranged in a matrix configuration. The micro-polarizer array 250 may include a plurality of polarization selective structures 255 (e.g., each functions as a micro-polarizer) arranged corresponding to the plurality of lenses in the on-chip micro-lens array 240. Each of the polarization selective structures 255 may be configured with a predetermined polarization orientation, such that a light of a predetermined polarization may transmit through the polarization selective structure, whereas lights of other polarizations may be blocked. For example, FIG. 2D shows that the micro-polarizer array 250 may include polarization selective structures 255 with 0-degree, 45-degree, 90-degree, and 135-degree polarization orientations. In some embodiments, the micro-polarizer array 250 may include pixelated wire-grid polarizers. The photo diode array 260 may include a plurality of photo diodes 265 arranged corresponding to the plurality of polarization selective structures 255 to receive the light transmitted through the corresponding polarization selective structures 255. In some embodiments, the plurality of photo diodes 265, the plurality of polarization selective structures 255, and the plurality of lenses 245 may be one-to-one corresponding to one another. In some embodiments, the on-chip micro-lens array 240 may be omitted in the pixelated polarized camera 230.

Through using the pixelated polarized camera 230, each photo diode 265 may receive a light of a predetermined polarization, such as a light of 0-degree, 45-degree, 90-degree, or 135-degree polarization direction. Separate images may be generated based on the received lights of different polarizations, or a single image may be generated based on a combination of the lights of different polarizations. For example, referring to FIG. 2A and FIG. 2D, the waveplate (e.g., QWP) 210 may be configured to convert the first signal light (e.g., RHCP light) 206 to a first linearly light of a 0-degree polarization direction, and convert the second signal light (e.g., LHCP light) 208 into a second linearly polarized light of a 90-degree polarization direction. A first eye tracking image may be generated based on a signal provided by the photo diodes receiving the first linearly polarized light of the 0-degree polarization direction, and a second eye tracking image may be generated based on a signal provided by the photo diodes receiving the second linearly polarized light of the 90-degree polarization direction. That is, the pixelated polarized camera 230 may be configured to receive the first signal light (e.g., RHCP light) 206 and the second signal light (e.g., LHCP light) 208 by different photo diodes corresponding to the micro-polarizers having a first polarization orientation (e.g., the 0-degree polarization orientation) and micro-polarizers having a second polarization orientation (e.g., the 90-degree polarization orientation), respectively. Thus, different perspective views of the eye 115 may be generated based on the first signal light (e.g., RHCP light) 206 and the second signal light (e.g., LHCP light) 208, thereby providing a spatial multiplexing multi-view eye tracking with enhanced eye tracking accuracy. In addition, the images of the eye 115 captured by the pixelated polarized camera 230 may include additional polarization information, which may be used to determine various properties of a tracked object (e.g., the eye 115).

Figure 3:
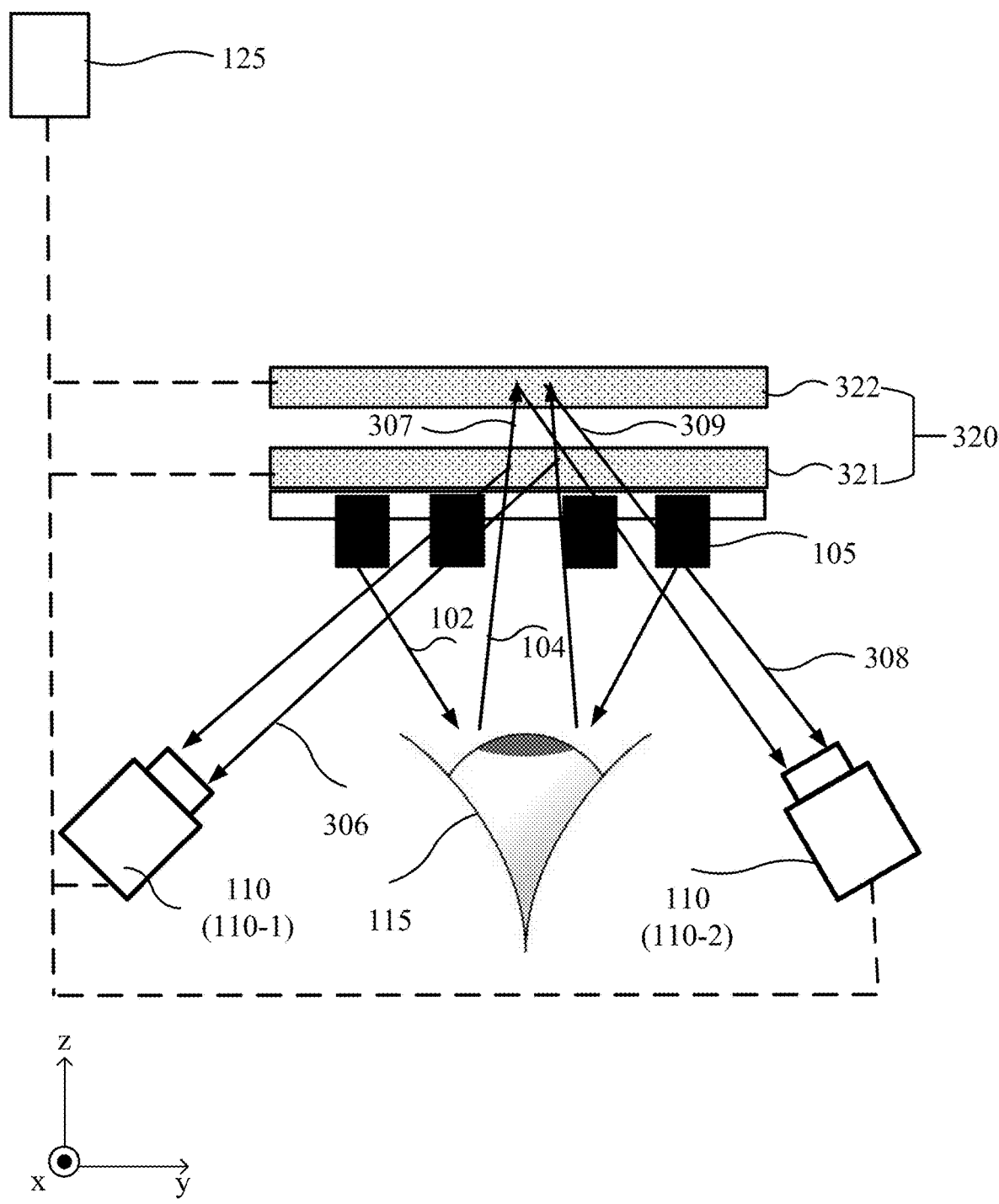
FIG. 3 illustrates a schematic diagram of an object tracking system, according to an embodiment of the present disclosure.

FIG. 3 illustrates a y-z sectional view (e.g., a top view) of an object tracking system (e.g., eye tracking system) 300, according to an embodiment of the present disclosure. The eye tracking system 300 may include elements, structures, and/or functions that are the same as or similar to those included in the eye tracking system 100 shown in FIGS. 1A and 1B or the eye tracking system 200 shown in FIGS. 2A-2D. Detailed descriptions of the same or similar elements, structures, and/or functions may refer to the above descriptions rendered in connection with FIGS. 1A and 1B or FIGS. 2A-2D. As shown in FIG. 3, the eye tracking system 300 may include one or more light sources 105, a polarization selective optical element 320, and one or more optical sensors 110. The one or more light sources 105 may be configured to emit the light 102 to illuminate one or two eyes 115 of a user. The eye 115 may reflect the light 102 as the light 104 propagating toward the polarization selective optical element 320. The polarization selective optical element 320 may be configured to split (e.g., deflect) the light 104 reflected by the eye 115 as a plurality of signal lights, e.g., a first signal light 306 and a second signal light 308, propagating towards the one or more optical sensors 110. In some embodiments, the polarization selective optical element 320 may be configured to diffract the light 104 as the plurality of diffracted lights propagating towards the one or more optical sensors 110.

In the embodiment shown in FIG. 3, the eye tracking system 300 is shown as including two optical sensors 110 disposed apart from one another at both sides of the eye 115 (or user). The two optical sensors 110 are labelled as the first optical sensor 110-1 and the second optical sensor 110-2. The eye tracking system 300 may be referred to as a dual camera eye tracking system. The optical sensors 110-1 and 110-2 may be disposed obliquely relative to a normal of a light exiting surface of the polarization selective optical element 320. That is, the optical sensors 110-1 and 110-2 may be disposed off-axis with respect to the line of sight of the eye 115. The optical sensors 110-1 and 110-2 and the eye 115 may be located at the same side of the polarization selective optical element 320. The polarization selective optical element 320 may be a reflective polarization selective optical element, which may be configured to backwardly diffract the light 104 reflected by the eye 115 as the first signal light 306 propagating in a first direction toward the first optical sensor 110-1 and the second signal light 308 propagating in a second direction toward the second optical sensor 110-2. The first direction may be substantially different from the first direction. In some embodiments, the first signal light 306 and the second signal light 308 may be diffracted lights having opposite diffraction angles. For example, one of the first signal light 306 and the second signal light 308 may have a positive diffraction angle, and the other of the first signal light 306 and the second signal light 308 may have a negative diffraction angle. In some embodiments, the first signal light 306 and the second signal light 308 may be orthogonally polarized lights.

In some embodiments, the first optical sensor 110-1 and the second optical sensor 110-2 may be positioned with suitable orientations or directions to receive the first signal light 306 and the second signal light 308, respectively. The first optical sensor 110-1 and the second optical sensor 110-2 may be configured to generate signals, data, or information based on the first optical sensor 110-1 and the second optical sensor 110-2, respectively. In some embodiments, individual images of the eye 115 may be generated by the optical sensors 110-1 and 110-2 based on the diffracted light 306 and light 308, respectively, thereby providing multiple perspective views of the eye 115. For example, a first perceptive view of the eye 115 may be obtained from a first image generated by the first optical sensor 110-1 based on the first signal light 306 received, and a second perceptive view of the eye 115 may be obtained from a second image generated by the second optical sensor 110-2 based on the second signal light 308. Compared to conventional eye tracking based on a single view or single signal, additional eye tracking information may be extracted from the light 104 reflected by the eye 115 by the optical sensors 110-1 and 110-2, thereby improving the accuracy of eye-tracking. The system 300 also provide larger tracking ranges of the eye 115 in the horizontal and/or vertical directions. The system 300 may provide enhanced user experience.

In some embodiments, the polarization selective optical element 320 may include a plurality of PVH elements (e.g., a first PVH element 321 and a second PVH element 322) arranged in an optical series. The number of PVH elements is not limited to two. The light 102 output from the light source 105 or the light 104 reflected by the eye 115 may include two orthogonally polarized components, e.g., an RHCP component and an LHCP component. The first PVH element 321 and the second PVH element 322 may be configured with different polarization selectivities. For example, one of the first PVH element 321 and the second PVH element 322 may be configured to substantially backwardly diffract the RHCP (or LHCP) component of the light 104, and substantially transmit the LHCP (or RHCP) component with negligible diffraction or no diffraction, and the other of the first PVH element 321 and the second PVH element 322 may be configured to substantially backwardly diffract the LHCP (or RHCP) component of the light 104 and substantially transmit the RHCP (or LHCP) component with negligible diffraction or no diffraction.

In some embodiments, the first PVH element 321 may be a right-handed PVH lens, and the second PVH element 322 may be a left-handed PVH lens. A PVH lens may provide a large field of view. Although not shown, in some embodiments, the first PVH element 321 and the second PVH element 322 may be PVH gratings. In some embodiments, one of the first PVH element 321 and the second PVH element 322 may be a PVH grating, and the other of the first PVH element 321 and the second PVH element 322 may be a PVH lens. The first PVH element (e.g., right-handed PVH lens) 321 may be configured to substantially backwardly diffract and converge or diverge the RHCP component of the light 104 as the first signal light (e.g., RHCP light) 306 having a positive diffraction angle and propagating toward the first optical sensor 110-1. The first PVH element 321 may substantially transmit, with negligible diffraction or no diffraction, the LHCP component of the light 104 as a light (e.g., an LHCP light) 307 propagating toward the second PVH element (e.g., left-handed PVH lens) 322. The second PVH element (e.g., left-handed PVH lens) 322 may be configured to substantially backwardly diffract and converge or diverge the light (e.g., an LHCP light) 307 as a light (e.g., an LHCP light) 309 having a negative diffraction angle and propagating toward the first PVH element (e.g., a right-handed PVH) 321. The first PVH element (e.g., right-handed PVH lens) 321 may substantially transmit the light (e.g., LHCP light) 309 as the second signal light (e.g., LHCP light) 308 propagating toward the second optical sensor 110-2. That is, the first PVH element 321 and the second PVH element 322 may split, via diffraction, the light 104 reflected by the eye 115 spatially as the first signal light (e.g., RHCP light) 306 and the second signal light (e.g., LHCP light) 308. Although not shown, in some embodiments, the first PVH element 321 may be configured to substantially backwardly diffract the RHCP component of the light 104 as a light (e.g., an RHCP light) having a negative diffraction angle, and the second PVH element 322 may be configured to substantially backwardly diffract the LHCP component of the light 104 as a light (e.g., an RHCP light) having a positive diffraction angle.

Figure 4A:
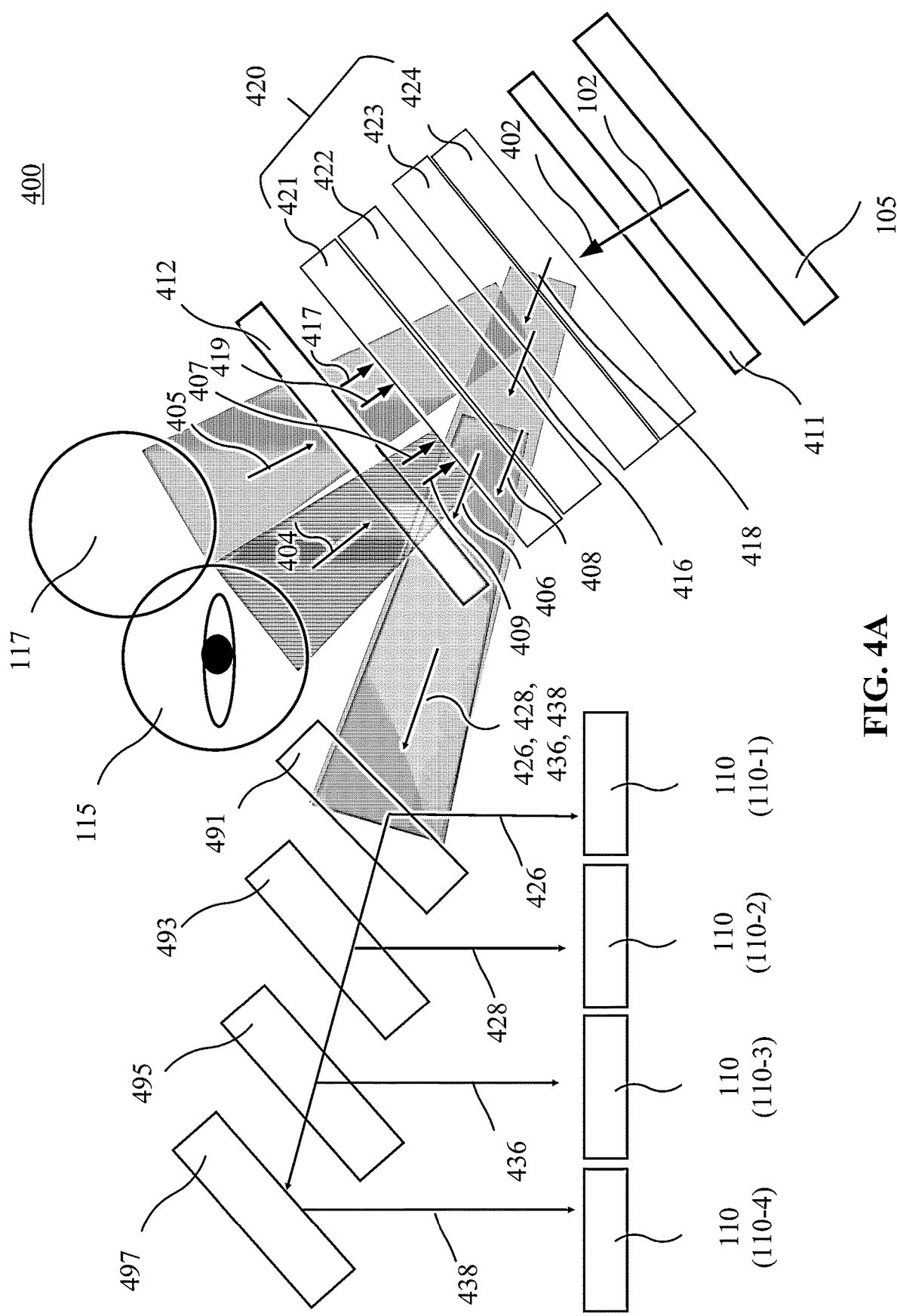
FIG. 4A illustrates a schematic diagram of an object tracking system, according to an embodiment of the present disclosure.
Figure 4B:
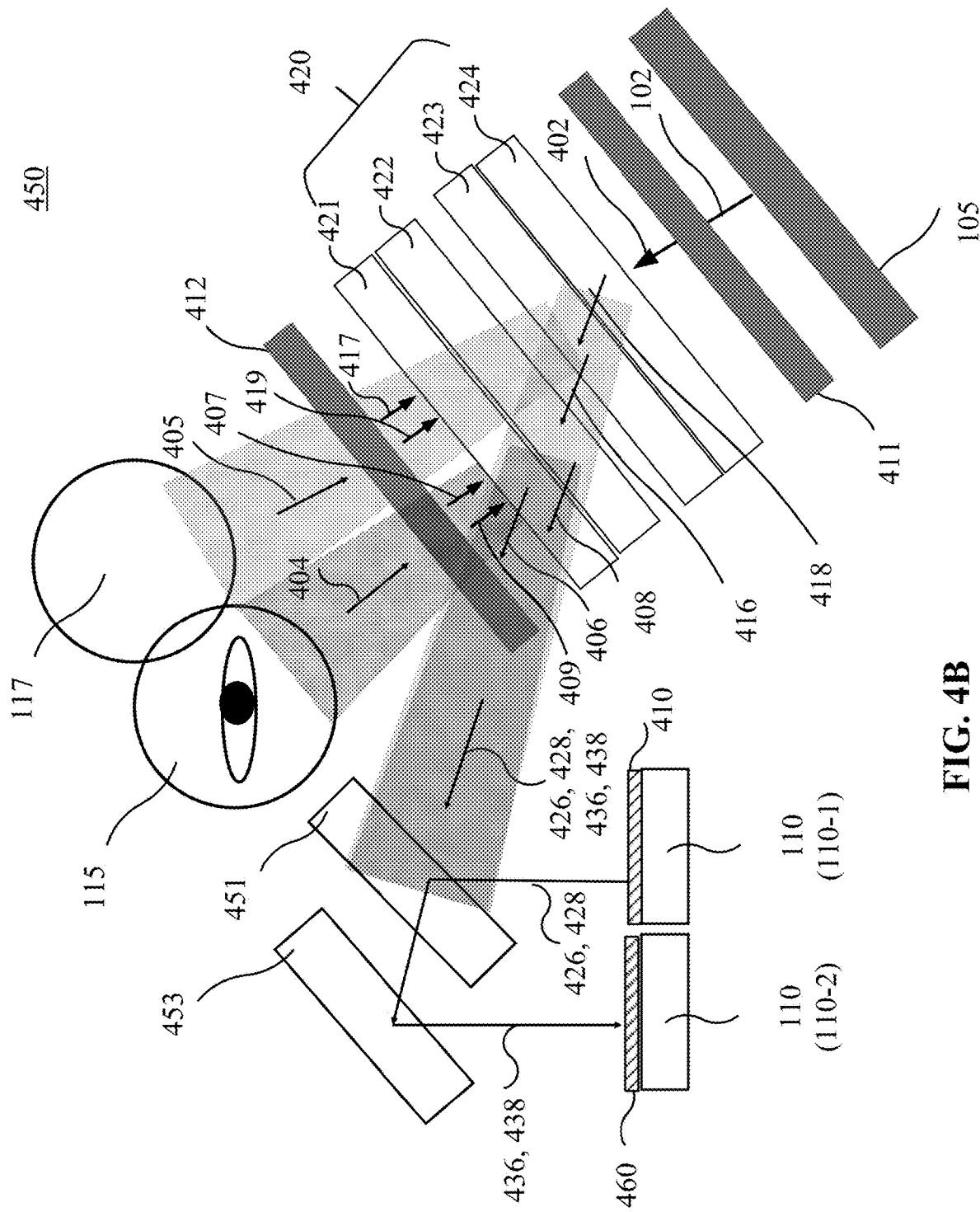
FIG. 4B illustrates a schematic diagram of an object tracking system, according to an embodiment of the present disclosure.

FIG. 4A and FIG. 4B illustrate object tracking systems configured to track a plurality of objects (or a plurality of portions of a single object) selectively reflecting IR lights with different wavelength ranges. For discussion purpose, the eye and an area near the eye (e.g., the face portions near the eye) are used as examples of two objects that are tracked. Thus, the systems shown in FIG. 4A and FIG. 4B may be configured for simultaneously tracking the eye(s) and the face of a user. For example, the eye may have a relatively higher reflectance for an IR light having a wavelength within a range from about 915 nm to about 965 nm and a central wavelength of about 940 nm. The face portions near the eye may have a relatively higher reflectance for an IR light having a wavelength within a range from about 875 nm to about 825 nm and a central wavelength of about 850 nm. The object tracking system may be referred to as a combined eye-tracking/face-tracking ("ET/FT") system. The combined eye-tracking/face-tracking ("ET/FT") system is described herein as an example of the object tracking system. It is understood that the object tracking systems and methods disclosed herein may be used to track other targets or objects other than the eye and the face.

FIG. 4A illustrates a y-z sectional view (e.g., a top view) of a combined ET/FT system 400, according to an embodiment of the present disclosure. The combined ET/FT system 400 may include elements, structures, and/or functions that are the same as or similar to those included in the eye tracking system 100 shown in FIGS. 1A and 1B, the eye tracking system 200 shown in FIGS. 2A-2D, or the eye tracking system 300 shown in FIG. 3. Detailed descriptions of the same or similar elements, structures, and/or functions may refer to the above descriptions rendered in connection with FIGS. 1A and 1B, FIGS. 2A-2D, or FIG. 3.

As shown in FIG. 4A, the ET/FT combined system 400 may include one or more light sources 105, a polarization selective optical element 420, and a plurality of optical sensors 110. The light source 105 may be configured to emit an IR light 102 for illuminating the eye 115 and a facial region 117 adjacent the eye 115. The eye 115 and the facial region 117 may be configured to selectively reflect IR lights having different wavelength ranges. For example, the eye 115 may have a relatively higher reflectance for an IR light having a wavelength range within a first IR wavelength range (e.g., from about 915 nm to about 965 nm and a central wavelength of about 940 nm), and the facial region 117 may have a relatively higher reflectance for an IR light having a wavelength range within a second IR wavelength range (e.g., from about 825 nm to about 875 nm and a central wavelength of about 850 nm). In some embodiments, the wavelength range of the IR light 102 may at least include the wavelength range from 825 nm to 965 nm. The eye 115 may substantially reflect the light 102 as a light 404 having the first IR wavelength range, and the facial region 117 may substantially reflect the light 102 as a light 405 having the second IR wavelength range. The polarization selective optical element 420 may be configured to split (e.g., deflect) the light 404 reflected by the eye 115 as a plurality of signal lights, e.g., a first signal light 406 and a second signal light 408, and split (e.g., deflect) the light 405 reflected by the facial region 117 as a plurality of signal lights, e.g., a third signal light 416 and a fourth signal light 418. In some embodiments, the combined ET/FT system 400 may also include a plurality of reflectors, e.g., first through fourth reflectors 491, 493, 495, and 497, which may be configured to reflect the signal lights 406, 408, 416, and 418 toward different optical sensors 110. In the embodiment shown in FIG. 4A, the combined ET/FT system 400 may include four optical sensors (first through fourth optical sensors) 110-1, 110-2, 110-3, and 110-4 configured to receive the signal lights 406, 408, 416, and 418, respectively.

In some embodiments, the polarization selective optical element 420 may include a plurality of PVH elements (e.g., first through fourth PVH elements) 421, 422, 423, and 424 arranged in an optical series. Two PVH elements configured with the opposite polarization selectivities and operating for substantially the same wavelength range may be referred to as a pair of PVH elements. The plurality of PVH elements 421, 422, 423, and 424 may include multiple pairs of PVH elements. For example, a first PVH element 421 and a second PVH element 422 may be a first pair of PVH elements configured to operate for the first IR wavelength range. A third PVH element 423 and a fourth PVH element 424 may be a second pair of PVH elements configured to operate for the second IR wavelength range. In some embodiments, the first PVH element 421 and the second PVH element 422 may be similar to the first PVH element 221 and the second PVH element 222 shown in FIG. 2A, respectively. The third PVH element 423 and the fourth PVH element 424 may be similar to the first PVH element 221 and the second PVH element 222 shown in FIG. 2A, respectively.

In some embodiments, the combined ET/FT system 400 may also include a first waveplate 411 and a second waveplate 412 for polarization conversion. The waveplates 411 and 412 may be QWPs configured to convert a circularly polarized light to a linearly polarized light and vice versa for lights with wavelengths within an IR spectrum at least covering the first IR wavelength range and the second IR wavelength range. The waveplate 411 may be disposed at a light outgoing side of the light source 105. In some embodiments, the light 102 emitted from the light source 105 may be a linearly polarized light. The waveplate 411 may be configured to convert the linearly polarized light 102 to a circularly polarized light 402 to illuminate the eye 115 and the facial region 117. In some embodiments, the light 102 emitted from the light source 105 may be configured to a circularly polarized light, and the waveplate 411 may be omitted. It is understood that the light source 105 may be positioned such that the light 102 may directly illuminate the eye 115 and the facial region 117, and may not pass through the polarization selective optical element 420 before reaching the eye 115 and the facial region 117.

The eye 115 and the facial region 117 may substantially reflect the circularly polarized light 402 as the light 404 having a wavelength range within the first IR wavelength range, and the light 405 having a wavelength range within the second IR wavelength range, respectively. In some embodiments, the reflected light 404 or 405 may include linearly polarized components of specular reflection and diffuse reflection. For example, the reflected light 404 may include s-polarized specular reflection (e.g., reflected by the cornea of the eye 115), s-polarized diffuse reflection (e.g., reflected by the pupil of the eye 115), and p-polarized diffuse reflection (e.g., reflected by the pupil of the eye 115). The reflected light 406 may include s-polarized specular reflection (e.g., reflected by a first portion of the facial region 117), s-polarized diffuse reflection (e.g., reflected by a second portion of the facial region 117), and p-polarized diffuse reflection (e.g., reflected by the second portion of the facial region 117).

The waveplate 412 may be arranged between the eye 115/facial region 117 and the polarization selective optical element 420. The waveplate 412 may be configured to convert the linearly polarized components of the reflected light 404 or 405 to circularly polarized lights propagating toward the polarization selective optical element 420. For example, the waveplate 412 may be configured to convert the s-polarized component and the p-polarized component of the reflected light 404 to a first RHCP light 407 and a first LHCP light 409, respectively. The waveplate 412 may be configured to convert the s-polarized component and the p-polarized component of the reflected light 406 to a second RHCP light 417 and a second LHCP light 419, respectively.

For discussion purposes, in FIG. 4A, the first PVH element 421 and the third PVH element 423 may be right-handed PVH lenses, the second PVH element 422 and the fourth PVH element 424 may be left-handed PVH lenses. A PVH lens may provide a large field of view. Although not shown, in some embodiments, the PVH elements 421, 422, 423, and 424 may be PVH gratings. In some embodiments, the PVH elements 421, 422, 423, and 424 may include at least one PVH lens and at least one PVH grating. The first PVH element (e.g., right-handed PVH lens) 421 may be configured to substantially backwardly diffract and converge or diverge the first RHCP light 407 as a first signal light (e.g., RHCP light) 406 propagating toward the waveplate 412, and substantially transmit, with negligible diffraction or no diffraction, the first LHCP light 409, the second RHCP light 417, and the second LHCP light 419 toward the second PVH (e.g., left-handed PVH lens) 422. The second PVH element (e.g., left-handed PVH lens) 422 may be configured to substantially backwardly diffract and converge or diverge the first LHCP light 409 as a second signal light (e.g., LHCP light) 408 propagating toward the first PVH element 421. The first PVH element 421 may substantially transmit, with negligible diffraction or no diffraction, the second signal light (e.g., LHCP light) 408 toward the waveplate 412. The second PVH element (e.g., left-handed PVH lens) 422 may be configured to substantially transmit, with negligible diffraction or no diffraction, the second RHCP light 417 and the second LHCP light 419 toward the third PVH element (e.g., right-handed PVH lens) 423.

The third PVH element (e.g., right-handed PVH lens) 423 may be configured to substantially backwardly diffract and converge or diverge the second RHCP light 417 as a third signal light (e.g., RHCP light) 416 propagating toward the second PVH element 422 and the first PVH element 421. The second PVH element 422 and the first PVH element 421 may substantially transmit, with negligible diffraction or no diffraction, the third signal light (e.g., RHCP light) 416 toward the waveplate 412. The third PVH element (e.g., right-handed PVH lens) 423 may be configured to substantially transmit, with negligible diffraction or no diffraction, the second LHCP light 419 toward the fourth PVH element (e.g., left-handed PVH lens) 424. The fourth PVH element (e.g., left-handed PVH lens) 424 may be configured to substantially backwardly diffract and converge or diverge the second LHCP light 419 as a fourth signal light (e.g., LHCP light) 418 propagating toward the third PVH element 423, the second PVH element 422, and the first PVH element 421. The third PVH element 423, the second PVH element 422, and the first PVH element 421 may substantially transmit, with negligible diffraction or no diffraction, the fourth signal light (e.g., LHCP light) 418 toward the waveplate 412.

The waveplate 412 may be configured to covert the first signal light (e.g., RHCP light) 406, the second signal light (e.g., LHCP light) 408, the third signal light (e.g., RHCP light) 416, and the fourth signal light (e.g., LHCP light) 418, as a first s-polarized light 426, a first p-polarized light 428, a second s-polarized light 436, and a second p-polarized light 438, respectively. The first s-polarized light 426, the first p-polarized light 428, the second s-polarized light 436, and the second p-polarized light 438 may propagate toward the first reflector 491. In some embodiment, the first s-polarized light 426 may include a first portion corresponding to the s-polarized specular reflection (e.g., reflected by the cornea of the eye 115) having a wavelength range within the first wavelength range, and a second portion corresponding to the s-polarized diffuse reflection (e.g., reflected by the pupil of the eye 115) having a wavelength range within the first wavelength range. The first p-polarized light 428 may correspond to the p-polarized diffuse reflection (e.g., reflected by the pupil of the eye 115) having a wavelength range within the first wavelength range. The second s-polarized light 436 may include a first portion corresponding to the s-polarized specular reflection (e.g., reflected by the first portion of the facial region 117) having a wavelength range within the second wavelength range, and a second portion corresponding to the s-polarized diffuse reflection (e.g., reflected by the second portion of the facial region 117) having a wavelength range within the second wavelength range. The second p-polarized light 438 may correspond to the p-polarized diffuse reflection (e.g., reflected by the second portion of the facial region 117) having a wavelength range within the second wavelength range.

The reflectors 491, 493, 495, and 497 may be configured to reflect the first s-polarized light 426, the first p-polarized light 428, the second s-polarized light 436, and the second p-polarized light 438 toward the optical sensors 110-1, 110-2, 110-3, and 110-4, respectively. In some embodiments, the first reflector 491 and the second reflector 493 may be linear reflectors configured to operate at a wavelength range within the first wavelength range. In some embodiments, the first reflector 491 and the second reflector 493 may be linear reflectors configured with different polarization selectivities for lights having a wavelength range within the first wavelength range. In some embodiments, the third reflector 495 and the fourth reflector 497 may be linear reflectors configured to operate at a wavelength range within the first wavelength range. In some embodiments, the third reflector 495 and the fourth reflector 497 may be linear reflectors configured with different polarization selectivities for lights having a wavelength range within the second wavelength range.

For example, the first reflector 491 may be configured to substantially reflect an s-polarized light having a wavelength range within the first wavelength range and substantially transmit a p-polarized light having a wavelength range within the first wavelength range. Thus, the first reflector 491 may be configured to substantially reflect the first s-polarized light 426 toward the first optical sensor 110-1, and substantially transmit the first p-polarized light 428, the second s-polarized light 436, and the second p-polarized light 438 toward the second reflector 493. In some embodiments, the first optical sensor 110-1 may be configured to generate a glint signal (e.g., a tracking signal for the glint) based on the received first s-polarized light 426.

The second reflector 493 may be configured to substantially reflect a p-polarized light having a wavelength range within the first wavelength range and substantially transmit an s-polarized light having a wavelength range within the first wavelength range. Thus, the second reflector 493 may substantially reflect the first p-polarized light 428 toward the second optical sensor 110-2, and substantially transmit the second s-polarized light 436 and the second p-polarized light 438 toward the third reflector 495. In some embodiments, the second optical sensor 110-2 may be configured to generate a non-glint signal (e.g., a tracking signal for a region other than the glint) based on the received first p-polarized light 428.

The third reflector 495 may be configured to substantially reflect an s-polarized light having a wavelength range within the second wavelength range, and substantially transmit a p-polarized light having a wavelength range within the second wavelength range. Thus, the third reflector 495 may substantially reflect the second s-polarized light 436 toward the third optical sensor 110-3, and substantially transmit the second p-polarized light 438 toward the fourth reflector 495. In some embodiments, the third optical sensor 110-3 may be configured to generate a first (e.g., primary) face tracking signal based on the received second s-polarized light 436.

The fourth reflector 495 may be a linear reflector configured to substantially reflect a p-polarized light having a wavelength range within the second wavelength range, and substantially transmit an s-polarized light having a wavelength range within the second wavelength range. Thus, the fourth reflector 495 may substantially reflect the second p-polarized light 438 toward the fourth optical sensor 110-4. In some embodiments, the fourth optical sensor 110-4 may be configured to generate a second (e.g., secondary) face tracking signal based on the received second p-polarized light 436.

For discussion purposes, FIG. 4A shows that the polarization selective optical element 420 is configured to backwardly diffract the lights 404 and 405 as the signal lights 406, 408, 416, and 418 having diffraction angles of the same sign, and the optical sensors 110-1, 110-2, 110-3, and 110-4 are disposed at the same side of the eye 115 or the facial region 117. Although not shown, in some embodiments, at least two of the signal lights 406, 408, 416, and 418 may have diffraction angles of opposite signs, and the optical sensors 110-1, 110-2, 110-3, and 110-4 may be disposed at two different sides of the eye 115 or facial region 117. For example, at least one of the optical sensors 110-1, 110-2, 110-3, and 110-4 may be disposed at the left side of the eye 115, and at least one of the optical sensors 110-1, 110-2, 110-3, and 110-4 may be disposed at the right side of the eye 115. In some embodiments, two optical sensors may be disposed at the left side of the eye or facial region, and the other two optical sensors may be disposed at the right side of the eye or facial region. In other words, the reflected lights 404 and 405 may be diffracted to angles of different signs. For example, two of the signal lights 406, 408, 416, and 418 may propagate to the left side of the eye or facial region, and the other two of the signal lights 406, 408, 416, and 418 may propagate to the right side of the eye or facial region.

FIG. 4B illustrates a y-z sectional view (e.g., a top view) of a combined ET/FT system 450, according to an embodiment of the present disclosure. The combined ET/FT system 450 may include elements, structures, and/or functions that are the same as or similar to those included in the eye tracking system 100 shown in FIGS. 1A and 1B, the eye tracking system 200 shown in FIGS. 2A-2D, the eye tracking system 300 shown in FIG. 3, or the combined ET/FT system 400 shown in FIG. 4A. Detailed descriptions of the same or similar elements, structures, and/or functions may refer to the above descriptions rendered in connection with FIGS. 1A and 1B, FIGS. 2A-2D, FIG. 3, or FIG. 4A. In the embodiment shown in FIG. 4B, the combined ET/FT system 450 may include two reflectors 451 and 453, and two optical sensors 110-1 and 110-2. For example, the first reflector 451 may be a linear reflector configured to operate at a wavelength range within the first wavelength range. For example, the first reflector 451 may be configured to substantially reflect the first s-polarized light 426 (having a wavelength range within the first wavelength range) and the first p-polarized light 428 (having a wavelength range within the first wavelength range) toward the first optical sensor 110-1, and substantially transmit the second s-polarized light 436 (having a wavelength range within the second wavelength range) and the second p-polarized light 438 (having a wavelength range within the second wavelength range) toward the second reflector 453. The second reflector 453 may be a linear reflector configured to operate at a wavelength range within the second wavelength range. The second reflector 453 may be configured to substantially reflect the second s-polarized light 436 (having a wavelength range within the second wavelength range) and the second p-polarized light 438 (having a wavelength range within the second wavelength range) toward the second optical sensor 110-2.

In some embodiments, the combined ET/FT system 450 may include a first polarization separator 410 disposed between the first reflector 451 and the first optical sensor 110-1, for separating the first s-polarized light 426 and the first p-polarized light 428 in space and/or in time. In some embodiments, the combined ET/FT system 450 may include a second polarization separator 460 disposed between the second reflector 453 and the second optical sensor 110-2, for separating the second s-polarized light 436 and the second p-polarized light 438 in space and/or in time. Thus, the optical sensor 110-1 or 110-2 may be configured to receive the s-polarized light and the p-polarized light in a time multiplexing manner and/or a spatial multiplexing manner, and generate different tracking signals based on the received lights. The polarization separator 410 or 460 may be similar to the polarization separator 210 shown in FIGS. 2A-2D. For example, the polarization separator 410 or 460 may include a polarization selective beam steering assembly (similar to that shown in FIG. 2C), a combination of a polarization switch and a polarizer arranged in an optical series (similar to the polarization switch 212 and the polarizer 213 shown in FIG. 2B), a wire grid polarizer (similar to the pixel-level micro-polarizer array 250 shown in FIG. 2D). In some embodiments, the optical sensors 110-1 and 110-2 may be pixelated polarized cameras (similar to the pixelated polarized camera 230 shown in FIG. 2D), and the polarization separators 410 and 460 may be omitted.

In some embodiments, the first optical sensor 110-1 may be configured to generate a glint signal (e.g., a tracking signal for the glint) based on the received first s-polarized light 426 and a non-glint signal (e.g., a tracking signal for a region other than the glint) based on the received first p-polarized light 428. The second optical sensor 110-2 may be configured to generate a first (e.g., primary) face-tracking signal based on the received second s-polarized light 436, and a second (e.g., secondary) face-tracking signal based on the received second p-polarized light 436.

For discussion purposes, FIG. 4B shows that the polarization selective optical element 420 is configured to backwardly diffract the lights 404 and 405 as the signal lights 406, 408, 416, and 418 having diffraction angles of the same sign, and the optical sensors 110-1 and 110-2 are disposed at the same side of the eye 115, e.g., the left side of the eye 115. Although not shown, in some embodiments, at least two of the signal lights 406, 408, 416, and 418 may have diffraction angles of opposite signs, and the optical sensors 110-1 and 110-2 may be disposed at two different sides of the eye 115. For example, one of the optical sensors 110-1 and 110-2 may be disposed at the left side of the eye 115, and the other one of the optical sensors 110-1 and 110-2 may be disposed at the right side of the eye 115.

Figure 5A:
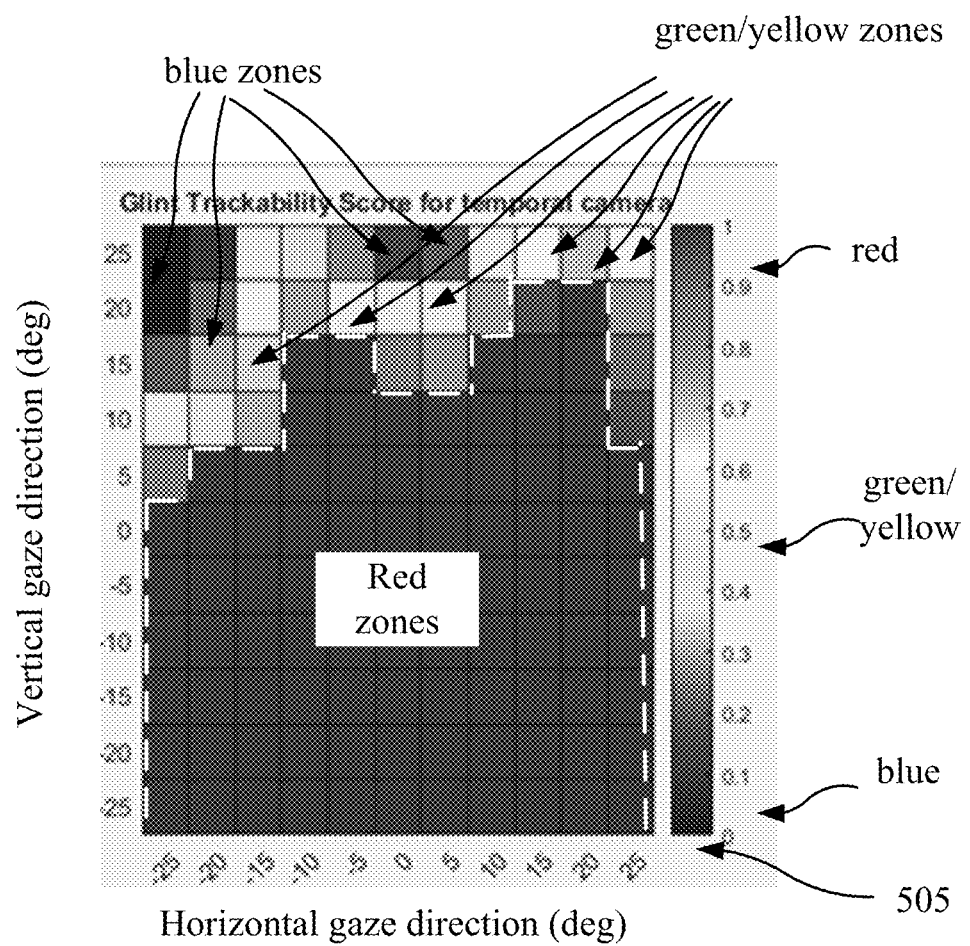
FIG. 5A illustrates a grid image showing simulation results of glint trackability scores versus gaze directions provided by a conventional eye tracking system including a single temporal camera.
Figure 5B:
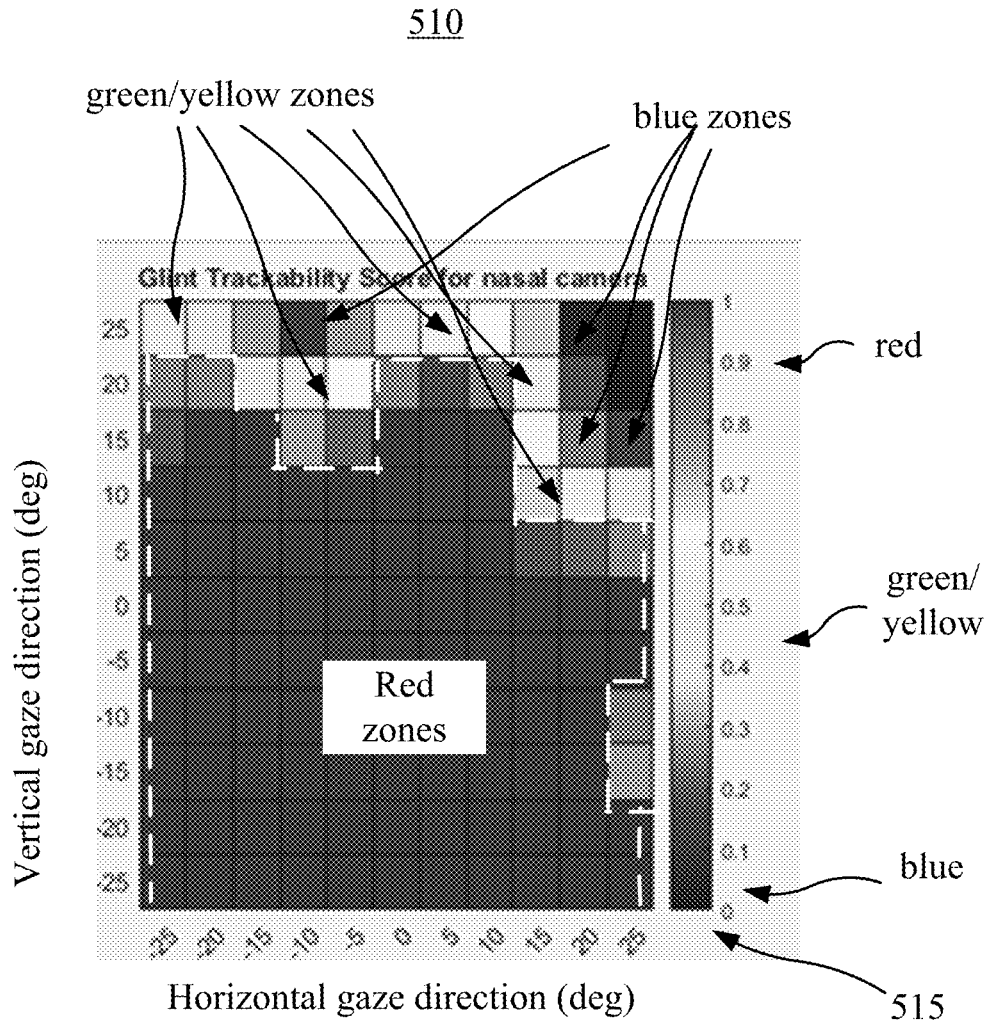
FIG. 5B illustrates a grid image showing simulation results of glint trackability scores versus gaze directions provided by a conventional eye tracking system including a single nasal camera.
Figure 5C:
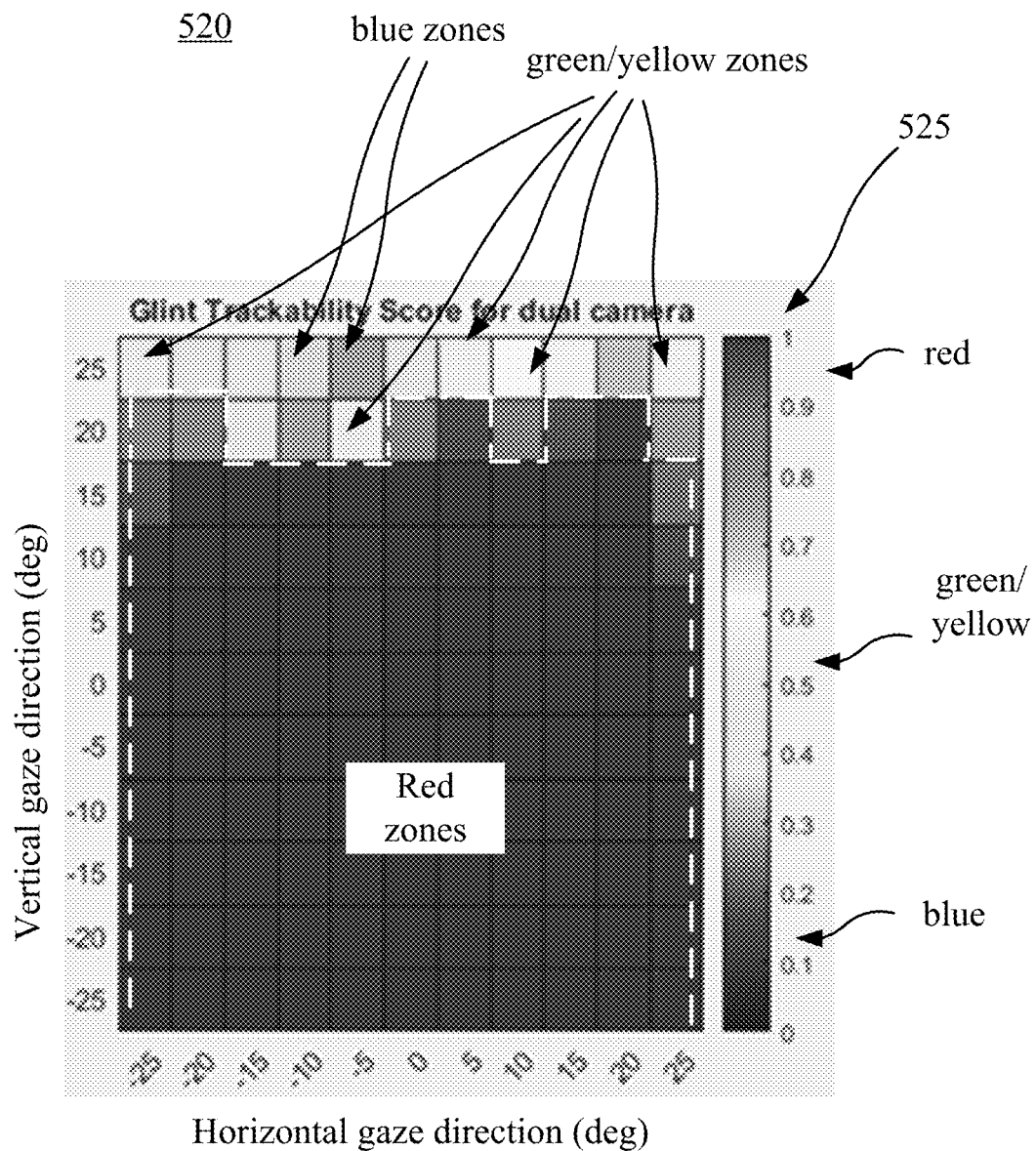
FIG. 5C illustrates a grid image showing simulation results of glint trackability scores versus gaze directions provided by an object tracking system including dual cameras, according to an embodiment of the present disclosure.

FIG. 5A illustrates a grid image 500 showing simulation results of glint trackability scores versus gaze directions (vertical and horizontal) provided by a conventional eye tracking system that includes a single temporal camera (i.e., a camera disposed near the temple). FIG. 5B illustrates a grid image 510 showing simulation results of glint trackability scores versus gaze directions provided by a conventional eye tracking system that includes a single nasal camera (i.e., a camera disposed near the nose). FIG. 5C illustrates a grid image 520 showing simulation results of glint trackability scores versus gaze directions provided by an object tracking system that includes dual cameras (e.g., the eye-tracking system 300 shown in FIG. 3), according to an embodiment of the present disclosure. The dual camera configuration of the disclosed object tracking system is used as an example to illustrate the increase in the glint trackability scores in horizontal and vertical gaze directions as compared to conventional systems. Other disclosed configurations of the disclosed object tracking system also yield better results as compared to the conventional systems.

As shown in FIGS. 5A-5C, the horizontal axis represents the horizontal gaze direction (unit: degree), and the vertical axis represents the vertical gaze direction (unit: degree). The color bar 505, 515, or 525 (from blue (0) to red (1)) is shown to represent the glint trackability score of an eye tracking system. On the color bar 505, 515, or 525, the blue color denotes a lower glint trackability score (close to 0), and the red color denotes a higher glint trackability score (close to 1). In the middle of the color bar is the green/yellow color representing medium scores between 0 and 1, near 0.5. As the color gradually changes from the blue to the red, the glint trackability score gradually increases from 0 to 1. A higher glint trackability score indicates a higher quality glint provided by the eye tracking system. The glint trackability score of equal to or close to 1 indicates a high quality glint obtained by the eye tracking system. The glint trackability score of below 0.5 indicates a low quality glint provided by the eye tracking system, which may result in degraded eye tracking performance.

As shown in FIGS. 5A-5C, as the horizontal gaze direction changes from −25 degree to 25 degree with respect to a reference point, and the vertical gaze direction change from −25 degree to 25 degree with respect to the reference point, the grid image 520 shown in FIG. 5C has more blocks in red color than the grid image 500 shown in FIG. 5A and the grid image 510 shown in FIG. 5B. In the grid image 520 shown in FIG. 5C, the blocks in red color cover a relatively larger shift range of the gaze, e.g., from −25 degree to 25 degree in the horizontal gaze direction and from −25 degree to 15 degree in the vertical gaze direction. As a comparison, in the grid image 500 shown in FIG. 5A, the blocks in red color cover a relatively smaller shift range of the gaze, e.g., from −25 degree to 25 degree in the horizontal gaze direction and from −25 degree to 5 degree in the vertical gaze direction. In the grid image 510 shown in FIG. 5B, the blocks in red color cover a relatively smaller shift range of the gaze, e.g., from −25 degree to 10 degree in the horizontal gaze directions and from −25 degree to 15 degree in the vertical gaze direction. That is, compared to the conventional eye tracking system that includes a single temporal camera or a signal nasal camera, the disclosed object tracking system including dual cameras (e.g., the eye tracking system 300 shown in FIG. 3) may provide a higher quality glint detection in a larger shift range of the gaze. As a result, the disclosed object tracking system including dual cameras (e.g., the eye tracking system 300 shown in FIG. 3) may enlarge the tracking region and increase tracking accuracy.

Diffractive components (e.g., PVH elements) included in optical systems (e.g., NEDs, HUDs) for AR or MR applications, such as a light guide display, an eye tracking combiner, may diffract a visible polychromatic light from a real world environment, causing a multicolored glare in a see-through view, when a user wearing the optical system looks at a bright light source from certain angles. Such a see-through artifact is referred to as a "rainbow effect," which may degrade the image quality of the see-through view. To reduce or suppress the rainbow effect, the present disclosure also discloses a PVH element having a high diffraction efficiency for IR lights of a predetermined polarization and a low rainbow effect for visible lights. The disclosed PVH element may include a primary birefringent medium layer having a first birefringence, and two or more secondary birefringent medium layers stacked with the primary birefringent medium layer and distributed on both sides of the primary birefringent medium layer. Each of the two or more secondary birefringent medium layers may have a birefringence. The birefringences of the two or more secondary birefringent medium layers may be the same or may be different. The primary birefringent medium layer and the two or more secondary birefringent medium layers may include birefringent materials having chiralities. The first birefringence may be larger than the two or more birefringences.

Figure 6A:
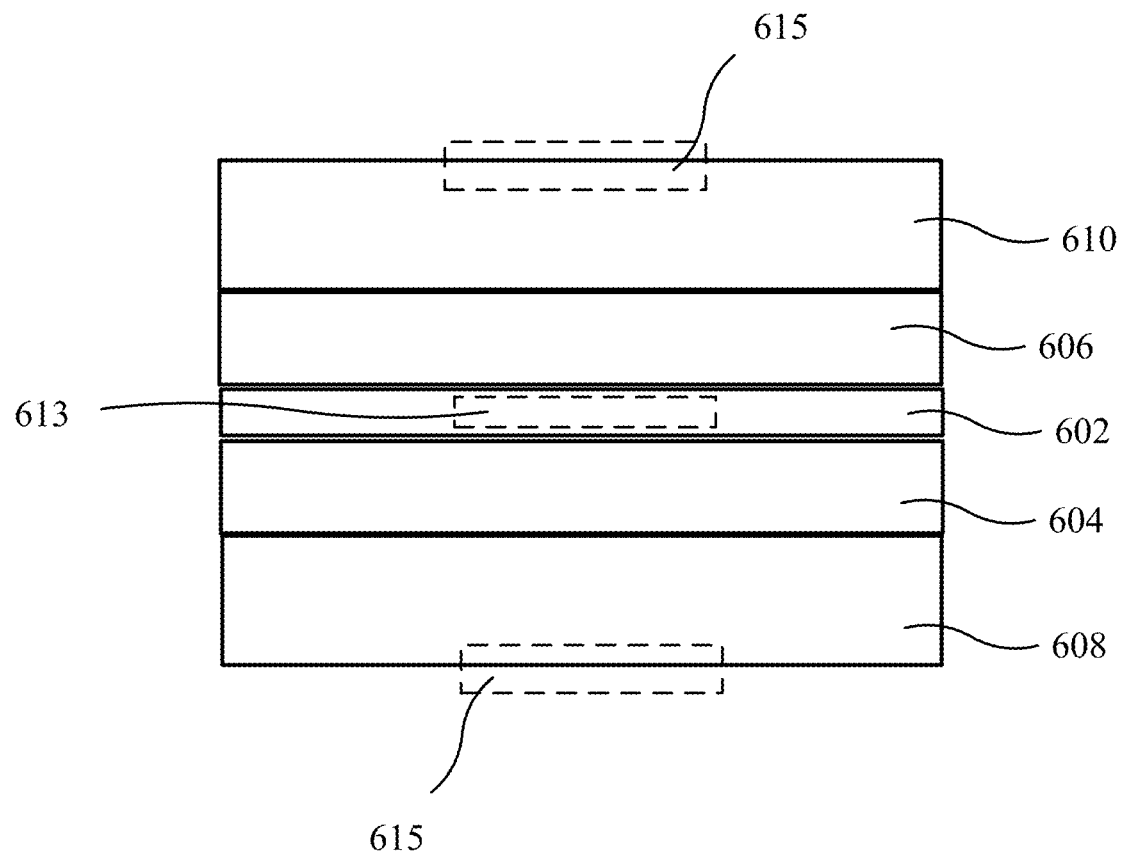
FIG. 6A illustrates a schematic diagram of a multi-layer polarization volume hologram ("PVH"), according to another embodiment of the present disclosure.

FIG. 6A illustrates a schematic diagram of a PVH element 600, according to an embodiment of the present disclosure. The PVH element 600 may be any suitable PVH element, such as a PVH lens element, or a PVH grating element, etc. As shown in FIG. 6A, in some embodiments, the PVH element 600 may be a multi-layer PVH include a stack of PVH layers 602, 604, 606, 608, and 610. The PVH layer 602 may be a primary PVH layer, the PVH layers 604, 606, 608, and 610 may be secondary PVH layers stacked with the primary PVH layer 603 and distributed at both sides of the primary PVH layer 602. The number of secondary PVH layers distributed at each side of the primary PVH layer 602 may be the same or may be different. In some embodiments, each of the PVH layers 602, 604, 606, 608, and 610 may include a birefringent medium in a form of a layer (also referred to a birefringent medium layer), and the birefringent medium may have a birefringence and a chirality. For discussion purposes, the birefringence and the chirality of the birefringent medium included in the PVH layer may also be referred to as the birefringence and the chirality of the PVH layer, respectively. A birefringence of the primary PVH layer 602 may be larger than a birefringence of each of the plurality of secondary PVH layers 604, 606, 608, and 610. In some embodiments, the thickness of the primary PVH layer 602 may be smaller than the thickness of each of the plurality of secondary PVH layers 604, 606, 608, and 610. The PVH element 600 may include any suitable number of secondary PVH layers, such as two, three, five, six, or seven, etc. In some embodiments, the secondary PVH layers disposed at both sides of the primary PVH layer 602 may be the same or substantially similar in terms of structural and optical properties. In some embodiments, the secondary PVH layers disposed at both sides of the primary PVH layer 602 may be different in terms of structural and optical properties.

In some embodiments, as shown in FIG. 6A, the secondary PVH layers 604, 606, 608, and 610 may be evenly distributed at both sides of the primary PVH layer 602. Although not shown, in some embodiments, the secondary PVH layers 604, 606, 608, and 610 may be unevenly distributed at both sides of the primary PVH layer 602. In some embodiments, two secondary PVH layers that are disposed symmetrically at both sides of the primary PVH layer 602 may be configured to have substantially the same parameters (e.g., structural and/or optical properties). For example, the secondary PVH layers 604 and 606 that are disposed symmetrically at both sides of the primary PVH layer 602 may be configured to have substantially the same parameters, e.g., the same birefringence, the same thickness, the same vertical pitch, and/or the same in-plane orientation pattern. The secondary PVH layers 608 and 610 that are disposed symmetrically at both sides of the primary PVH layer 602 may be configured to have substantially the same parameters, e.g., the same birefringence, the same thickness, the same vertical pitch, and/or the same in-plane orientation pattern. In some embodiments, two secondary PVH layers that are disposed symmetrically at both sides of the primary PVH layer 602 may be configured to have at least one different parameter. For example, the secondary PVH layers 604 and 606 that are disposed symmetrically at both sides of the primary PVH layer 602 may be configured with different birefringences, different thicknesses, different vertical pitches, and/or different in-plane orientation patterns. The secondary PVH layers 608 and 610 that are disposed symmetrically at both sides of the primary PVH layer 602 may be configured with different birefringences, different thicknesses, different vertical pitches, and/or different in-plane orientation patterns. In some embodiments, when the secondary PVH layers 604, 606, 608, and 610 are evenly distributed at both sides of the primary PVH layer 602, the birefringence of the PVH element 600 may be configured to vary along a thickness direction of the PVH element 600 (e.g., decreasing from a central portion 613 of the PVH element 600 to each of two edges or peripheries 615 of the PVH element 600. The central portion 613 and the two edges 615 may be corresponding portions of the PVH element 600 in the thickness direction.

In some embodiments, the PVH element 600 may be a multi-layer PVH element. In some embodiments, the PVH element 600 in the form of a multi-layer PVH may be configured with a gradient pitch distribution and/or a gradient refractive index distribution for reducing or eliminating the rainbow effects. For example, the vertical pitches of the PVH layers 602, 604, 606, 608, and 610 in the PVH element 600 may be configured with a gradient. In some embodiments, the refractive indices of the PVH layers 602, 604, 606, 608, and 610 in the PVH element 600 may be configured with a gradient.

In some embodiments, the PVH element 600 may be a single-layer PVH element. In some embodiments, the PVH element 600 in the form of a single-layer PVH may be configured with a gradient pitch distribution and/or a gradient refractive index distribution for reducing or eliminating the rainbow effects. In some embodiments, the birefringence of the PVH element 600 may be configured to vary along a thickness direction of the PVH element 600 (e.g., decreasing from a central portion 613 of the PVH element 600 to each of two edges or peripheries 615 of the PVH 600. The central portion 613 and the two edges or peripheries 615 may be corresponding portions of the PVH element 600 in the thickness direction (e.g., the z-axis direction in FIG. 6A). In some embodiments, the PVH element 600 may be configured with a gradient vertical pitch.

Figure 6B:
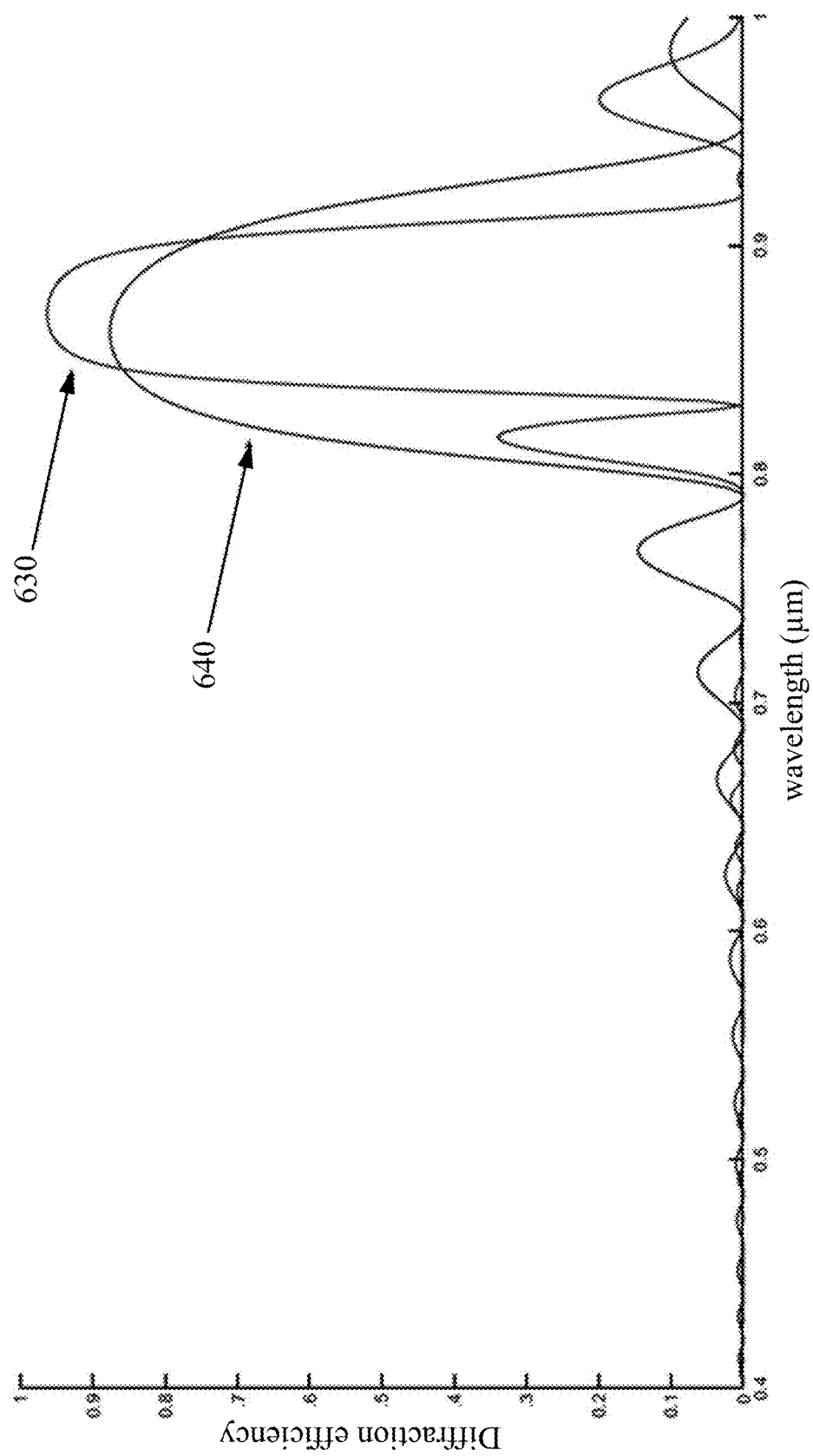
FIG. 6B illustrates simulation results showing a relationship between diffraction efficiency and wavelength for the multi-layer PVH shown in FIG. 6A and a conventional single-layer PVH.

FIG. 6B illustrates simulation results showing a relationship between diffraction efficiency and wavelength for the PVH element 600 shown in FIG. 6A and a conventional PVH element. In the PVH element 600, the birefringences of the primary PVH layer 602 and the second PVH layers 604, 606, 608, and 610 are presumed to be 0.15, 0.1, 0.1, 0.06, and 0.06, respectively. The thicknesses of the primary PVH layer 602 and the second PVH layers 604, 606, 608, and 610 are presumed to be 0.5 μm, 2.4 μm, 2.4 μm, 0.7 μm, and 0.7 μm, respectively. The conventional PVH element includes a single PVH layer having a constant birefringences of 0.15 and a thickness of 3 μm. The conventional PVH element is also referred to as a single-layer PVH element.

As shown in FIG. 6B, the horizontal axis represents the wavelength (unit: nm), and the vertical axis represents the diffraction efficiency. Curves 630 and 640 show the diffraction efficiency of the PVH element 600 and the conventional single-layer PVH element, respectively. In the NIR wavelength range (800 nm to 1000 nm), the highest diffraction efficiency of the PVH element 600 of the present disclosure is greater than 99%, and the highest diffraction efficiency of the conventional single-layer PVH element is smaller than 90%. The PVH element 600 of the present disclosure has a large bandwidth of about 45 nm over which the diffraction efficiency is greater than 90%. The PVH element 600 of the present disclosure may also exhibit large bandwidth and high diffraction efficiency for NIR lights with large incidence angles. In the visible wavelength range (400 nm to 700 nm), the diffraction efficiency of the PVH element 600 of the present disclosure is lower than the diffraction efficiency of the conventional single-layer PVH element. Thus, the rainbow effect caused by the PVH element 600 of the present disclosure may be reduced as compared to that of the conventional single-layer PVH element, for a visible incident light with a substantially same wavelength range and same incidence angle range. Compared to the conventional single-layer PVH element, the PVH element 600 of the present disclosure may have a higher diffraction efficiency for IR lights of a predetermined polarization and a low rainbow effect for visible lights.

The PVH element 600 (multi-layer or single-layer PVH element) disclosed herein may be implemented in various object tracking systems disclosed herein, such as the object tracking system 200 shown in FIG. 2A, the object tracking system 300 shown in FIG. 3, the object tracking system 400 shown in FIG. 4A, or the object tracking system 450 shown in FIG. 4B. For example, the PVH element 600 disclosed may be an embodiment of the PVH element 221, the PVH element 222, the PVH element 321, the PVH element 322, PVH element 421, or the PVH element 422. The PVH element 600 disclosed herein may enhance the performance of the various object tracking systems disclosed herein. The design principle of the PVH element 600 having a high diffraction efficiency for IR lights of a predetermined polarization and a low rainbow effect for visible lights may also be applied to other PVH elements with a high diffraction efficiency in wavelength ranges other than the IR wavelength range.

The PVH element disclosed herein have numerous applications in a large variety of fields, e.g., near-eye displays ("NEDs"), head-up displays ("HUDs"), head-mounted displays ("HMDs"), smart phones, laptops, televisions, vehicles, etc. For example, the PVH element disclosed may be implemented in various systems for augmented reality ("AR"), virtual reality ("VR"), and/or mixed reality ("MR") applications, to address accommodation-vergence conflict, to enable thin and highly efficient eye-tracking and depth sensing in space constrained optical systems, to extend the detecting range of sensors, to increase detecting resolution or accuracy of sensors, to develop optical combiners for image formation, to correct chromatic aberrations for image resolution enhancement of refractive optical elements in compact optical systems, and to increase the efficiency and reduce the size of optical systems.

Figure 7A:
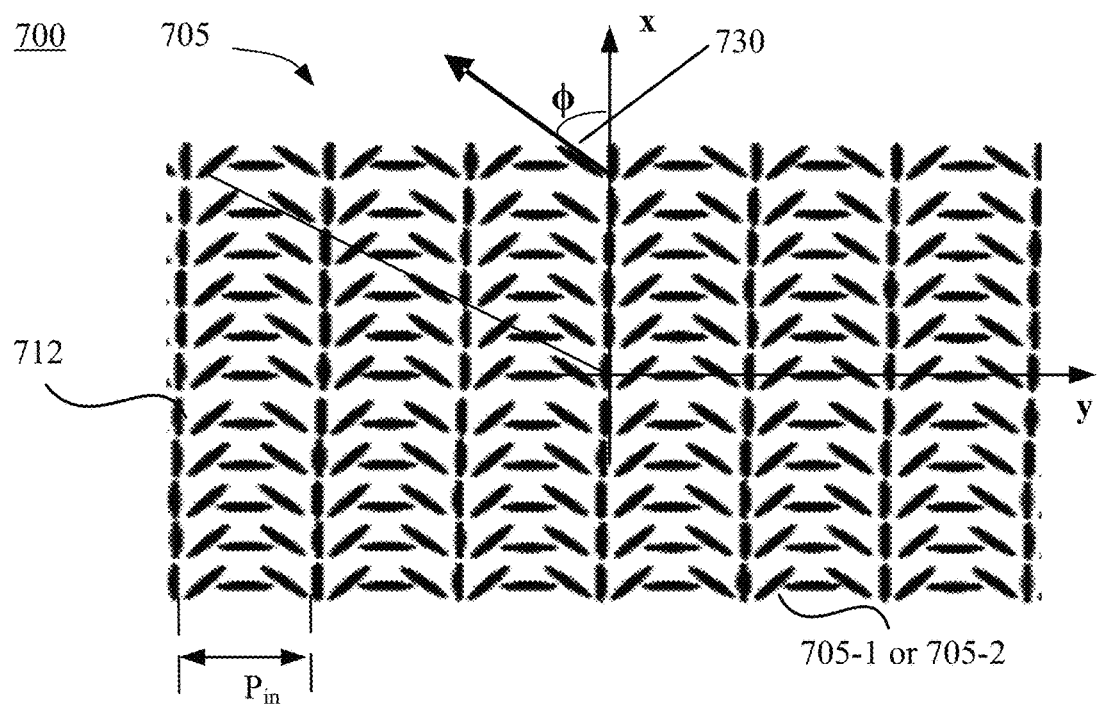
FIG. 7A schematically illustrates in-plane orientations of optically anisotropic molecules included in a PVH layer, according to an embodiment of the present disclosure.
Figure 7B:
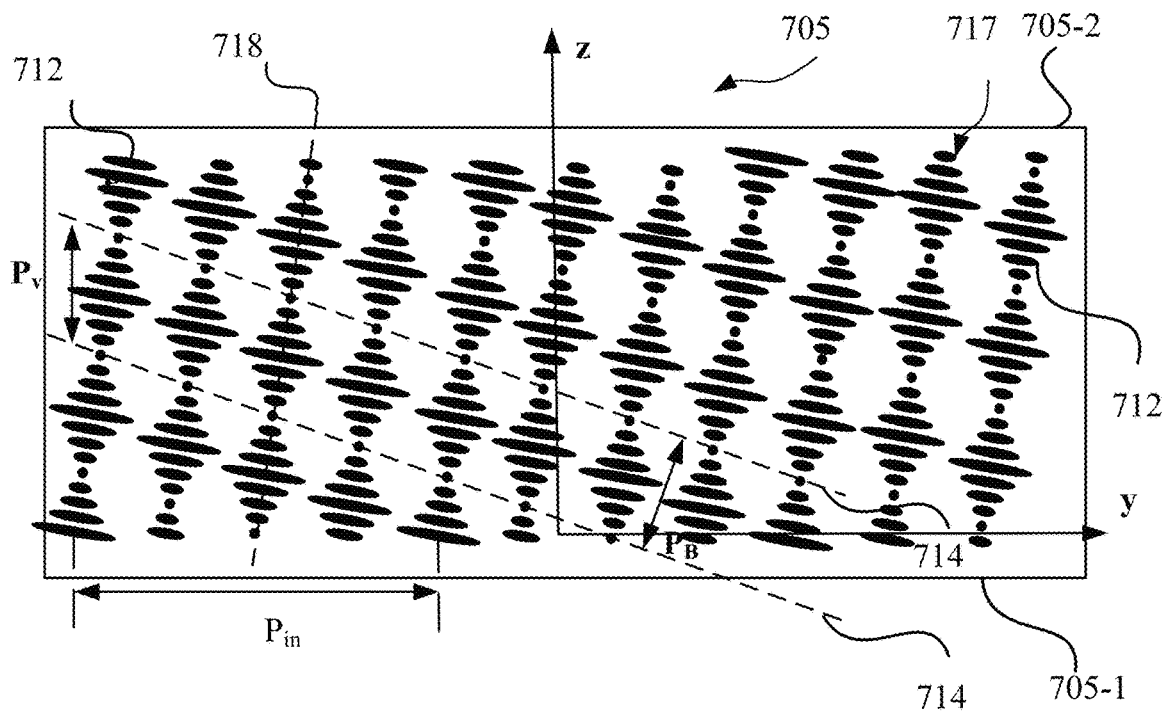
FIG. 7B schematically illustrates out-of-plane orientations of optically anisotropic molecules included in a PVH layer, according to an embodiment of the present disclosure.
Figure 7C:
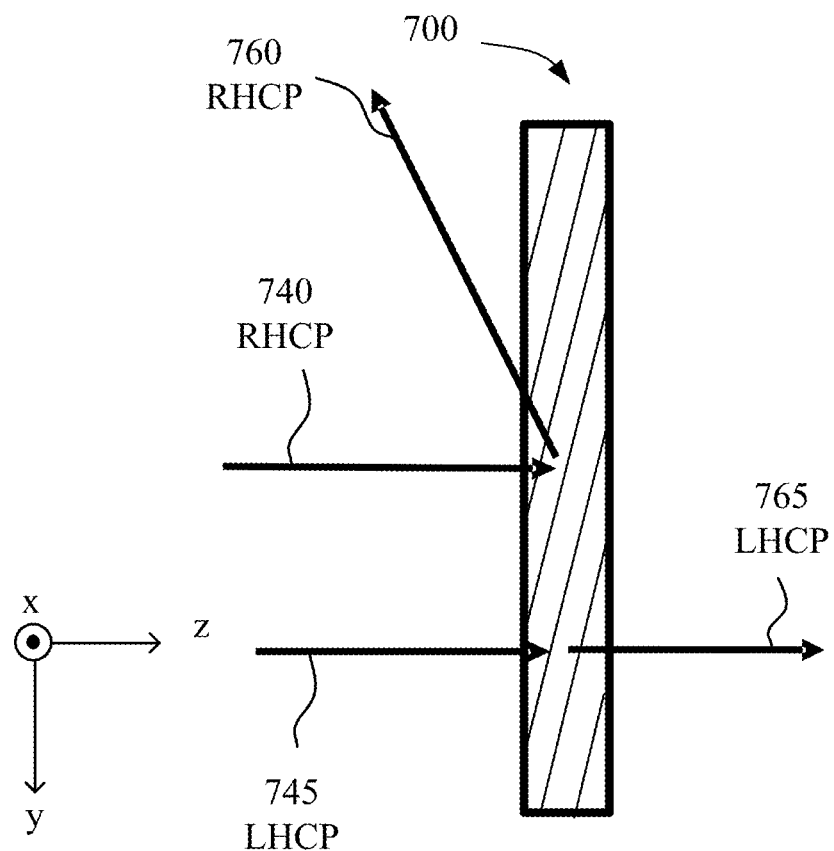
FIG. 7C schematically illustrates polarization selective diffractions of a PVH layer, according to an embodiment of the present disclosure.

FIGS. 7A-7C illustrate a PVH layer 700, according to an embodiment of the present disclosure. The PVH layer 700 may be an embodiment of the PVH layer 602, the PVH layer 604, the PVH layer 606, the PVH layer 608, or the PVH layer 610 shown in FIG. 6A. In some embodiments, the PVH layer 700 may also be a layer in the PVH element 221, the PVH element 222, the PVH element 321, the PVH element 322, PVH element 421, or the PVH element 422 shown in FIG. 2A, FIG. 3, FIG. 4A, or FIG. 4B. In some embodiments, the PVH layer 700 may include a birefringent medium (or material) 705 in a form of a film (also referred to as a birefringent medium film or a birefringent film 705). The birefringent film 705 may include optically anisotropic molecules 712 arranged in a predetermined 3D orientation pattern. Calamitic (rod-like) LC molecules are used as examples of optically anisotropic molecules 712. The rod-like LC molecule may have a longitudinal direction (or a length direction) and a lateral direction (or a width direction). The longitudinal direction of the LC molecule may be referred to as a director of the LC molecule or an LC director. An orientation of the LC director may determine a local optic axis orientation or an orientation of the optic axis at a local point of the birefringent film. For example, the optic axis of the birefringent film 705 may periodically or non-periodically vary in at least one in-plane linear direction, in at least one in-plane radial direction, in at least one in-plane circumferential (e.g., azimuthal) direction, or a combination thereof. The LC molecules may be configured with an in-plane orientation pattern, in which the directors of the LC molecules may periodically or non-periodically vary in the at least one in-plane direction. In some embodiments, the optic axis of the birefringent film 705 may also be configured with a spatially varying orientation in an out-of-plane direction. The directors of the LC molecules may also be configured with spatially varying orientations in an out-of-plane direction.

FIG. 7A schematically illustrates an x-y sectional view of an in-plane orientation pattern of LC molecules 712 in the birefringent film 705 of the PVH layer 700, according to an embodiment of the present disclosure. FIG. 7B schematically illustrates a y-z sectional view of an out-of-plane orientation pattern of the LC molecules 712 in the birefringent film 705 of the PVH layer 700, according to an embodiment of the present disclosure. The birefringent film 705 may include a first surface 705-1 and a second surface 705-2 opposite to the first surface 705-1. As shown in FIG. 7A, in a region substantially close to (including at) a surface (e.g., at least one of the first surface 705-1 or the second surface 705-2) of the birefringent film 705, the LC molecules 712 may be configured with an in-plane orientation pattern, e.g., a periodic in-plane orientation pattern with a uniform (e.g., same) in-plane pitch $P_{in}$ in a predetermined in-plane direction (e.g., a y-axis direction). The LC directors of LC molecules 712 located in close proximity to or at a surface of the birefringent film 705 may be configured to periodically and continuously rotate in the predetermined in-plane direction along the surface (or in a plane parallel with the surface). In other words, azimuthal angels 730 (represented by 4) of the LC molecules 712 located in close proximity to or at the surface of the birefringent film 705 may be configured to periodically and continuously change in the predetermined in-plane direction along the surface.

The predetermined in-plane direction may be any suitable in-plane direction along the surface (or in a plane parallel with the surface) of the birefringent film 705. For illustrative purposes, FIG. 7A shows that the predetermined in-plane direction is a y-axis direction. The in-plane pitch $P_{in}$ is defined as a distance along the in-plane direction (e.g., the y-axis direction) over which the LC directors rotate by a predetermined value (e.g., 180°) from a predetermined initial state (or reference state). In some embodiments, the periodic in-plane orientation pattern with the uniform (or same) in-plane pitch $P_{in}$ shown in FIG. 7A may correspond to a grating pattern. Although not shown, the LC molecules 712 located in close proximity to or at a surface of the birefringent film 705 (or the optic axis of the birefringent film at a surface of the birefringent film) may be configured with other suitable in-plane orientation patterns, such as an in-plane orientation pattern corresponding to a prism pattern, a cylindrical lens pattern, a lens array pattern, an off-axis focusing lens, etc.

FIG. 7B schematically illustrates a y-z sectional view of a portion of out-of-plane orientations of the directors of the LC molecules 712 in the birefringent film 705 of the PVH layer 700 shown in FIG. 7A, according to an embodiment of the present disclosure. As shown in FIG. 7A, within a volume of the birefringent film 705, the LC molecules 712 may be arranged in a plurality of helical structures 717. Each of the helical structures 717 may have a helical axis 718. The helical structures 717 may have a same helical pitch along the helical axes 718. The azimuthal angles of the LC molecules 712 in a single helical structure 717 along a corresponding helical axis 718 may continuously vary in a predetermined rotation direction, e.g., clockwise direction or counter-clockwise direction. In other words, the LC directors of the LC molecules 712 in a single helical structure 717 along the helical axis 718 may continuously rotate in a predetermined rotation direction, such that the azimuthal angles of the LC molecules 712 along the helical axis 718 may continuously change. Accordingly, the helical structure 717 may exhibit a handedness, e.g., right handedness or left handedness.

In the embodiment shown in FIG. 7B, the helical axes 718 of the helical structures 717 may be tilted with respect to the first surface 705-1 and/or the second surface 705-2 of the birefringent film 705 (or with respect to the thickness direction of the birefringent film 705). For example, the helical axes 718 of the helical structures 717 may have an acute angle with respect to the first surface 705-1 and an obtuse angle with respect to the second surface 705-2 of the birefringent film 705. In addition, the birefringent film 705 may have a vertical pitch $P_v$, which may be defined as a distance along the thickness direction of the birefringent film 705 over which the LC directors of the LC molecules 712 rotate by a predetermined angle (e.g., 180°) or the azimuthal angles of the LC directors vary by a predetermined angle (e.g., 180°) from a predetermined initial state. The LC molecules 712 from the plurality of helical structures 717 having a first same orientation (e.g., same tilt angle and azimuthal angle) may form a first series of parallel refractive index planes 714 periodically distributed within the volume of the birefringent film 705.

Although not labeled, the LC molecules 712 with a second same orientation (e.g., same tilt angle and azimuthal angle) different from the first same orientation may form a second series of parallel refractive index planes periodically distributed within the volume of the birefringent film 705. Different series of parallel refractive index planes may be formed by the LC molecules 712 having different orientations. In the same series of parallel and periodically distributed refractive index planes 714, the LC molecules 712 may have the same orientation and the refractive index may be the same. Different series of refractive index planes may correspond to different refractive indices. In some embodiments, the series of parallel refractive index planes 714 may be slanted relative to the first surface 705-1 or the second surface 705-2. When the number of the refractive index planes (or the thickness of the birefringent medium film) increases to a sufficient value, Bragg diffraction may be established according to the principles of volume gratings. The periodically distributed refractive index planes 714 may also be referred to as Bragg planes 714. A distance (or a period) between adjacent Bragg planes 714 of the same series may be referred to as a Bragg period PB. The different series of Bragg planes formed within the volume of the birefringent film 705 may produce a varying refractive index profile that is periodically distributed in the volume of the birefringent film 705. The birefringent film 705 may modulate (e.g., diffract) an input light satisfying a Bragg condition through Bragg diffraction.

In some embodiments, the PVH layer 700 including the birefringent film 705 having the LC molecules 712 configured with the in-plane orientations as shown in FIG. 7A and the out-of-plane orientations as shown in FIG. 7B may function as a PVH grating 700 (e.g., a reflective PVH grating). The in-plane pitch $P_{in}$ may determine, in part, the optical properties of the PVH grating 700. The in-plane pitch $P_{in}$ may determine the diffraction angles of lights diffracted by the PVH grating in different diffraction orders. In some embodiments, the diffraction angle for a light having a predetermined wavelength may increase as the in-plane pitch $P_{in}$ decreases. The diffraction efficiency of the PVH grating 700 may be a function of the thickness of the birefringent film 705. For example, the diffraction efficiency of the PVH grating 700 may increase monotonically with the thickness and then gradually saturate (e.g., remain substantially constant).

FIG. 7C illustrates polarization selective diffractions of the PVH layer 700, according to an embodiment of the present disclosure. For discussion purposes, the PVH layer 700 functioning as a grating is used as an example. For discussion purposes, the PVH layer 700 may also be referred to as a PVH grating 700. The PVH grating 700 may be a passive PVH grating or an active PVH grating. In some embodiments, the PVH grating may be configured to substantially (or primarily) diffract a circularly polarized light having a predetermined handedness via Bragg diffraction, and substantially (or primarily) transmit (e.g., with negligible diffraction) a circularly polarized light having a handedness that is opposite to the predetermined handedness. In some embodiments, referring to FIG. 7B, the handedness of the helical structures 717 may define the polarization selectivity of the PVH grating 700. In some embodiments, the PVH grating 700 may be configured to substantially diffract a circularly polarized light having a handedness that is the same as the handedness of the helical structures 717, and substantially transmit (e.g., with negligible diffraction) a circularly polarized light having a handedness that is opposite to the handedness of the helical structures 717. In some embodiments, depending on the handedness of the helical structures 717 within the volume of the PVH grating 700, the PVH grating 700 may be referred to as a left-handed PVH grating or a right-handed PVH grating. For example, a left-handed PVH grating may be configured to substantially diffract an LHCP light, and substantially transmit (e.g., with negligible diffraction) an RHCP light. A right-handed PVH grating may be configured to substantially diffract an RHCP light and substantially transmit (e.g., with negligible diffraction) an LHCP light.

For discussion purposes, FIG. 7C shows polarization selective diffractions of the PVH grating 700 functioning as a reflective, right-handed PVH grating. As shown in FIG. 7C, the PVH grating 700 may be configured to substantially backwardly diffract an RHCP light 740 as a diffracted light (e.g., the $1^{st}$ order diffracted light) 760, and substantially transmit (e.g., with negligible diffraction) an LHCP light 745 as a transmitted light (e.g., the $0^{th}$ order) 765 with negligible diffraction or no diffraction. In some embodiments, the diffracted light 760 and the transmitted light 765 may be circularly polarized lights with handedness substantially maintained by the PVH grating 700. For example, the diffracted light 760 may be an RHCP light, and the transmitted light 765 may be an LHCP light.

Figure 8A:
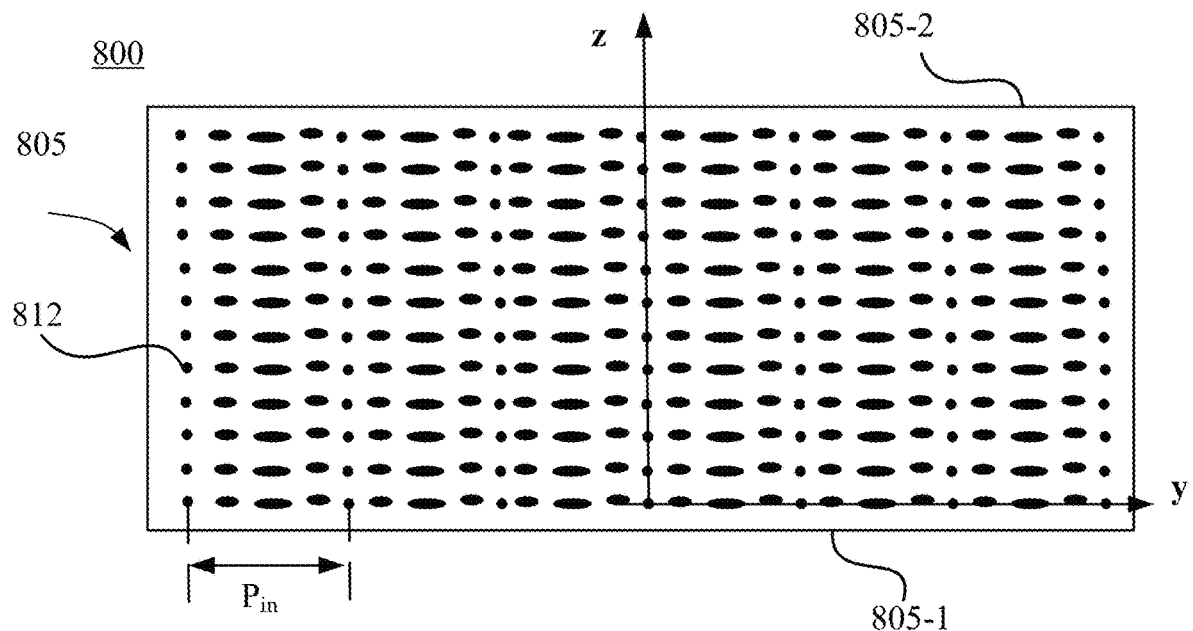
FIG. 8A schematically illustrates out-of-plane orientations of optically anisotropic molecules included in a Pancharatnam-Berry phase ("PBP") element, according to an embodiment of the present disclosure.
Figure 8B:
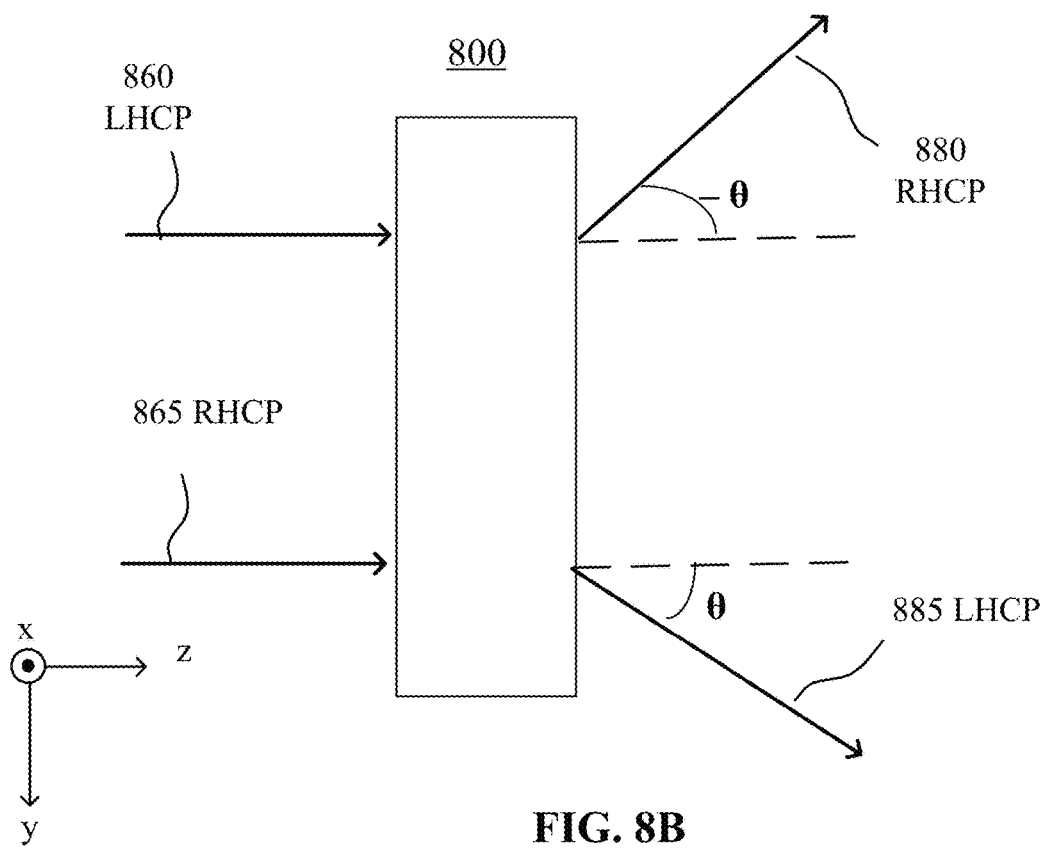
FIG. 8B illustrates polarization selective diffractions of a PBP element, according to an embodiment of the present disclosure.

FIGS. 8A-8B illustrate a PBP element 800, according to an embodiment of the present disclosure. The PBP element 800 may be an embodiment of the PBP element 122 included in the polarization selective optical element 120 shown in FIG. 1A or the polarization selective optical element 150 shown in FIG. 1B. FIG. 8A schematically illustrates an x-y sectional view of an out-of-plane orientation pattern of optically anisotropic molecules 812 in a birefringent film 805 of the PBP element 800, according to an embodiment of the present disclosure. The optically anisotropic molecules 812 in the birefringent film 805 may be arranged in a predetermined orientation pattern. Calamitic (rod-like) LC molecules are used as examples of the optically anisotropic molecules 812. The birefringent film 805 may include a first surface 805-1 and a second surface 805-2 parallel with the first surface 805-1. In a region substantially close to (including at) a surface (e.g., at least one of the first surface 805-1 or the second surface 805-2) of the birefringent film 805, the optic axis of the birefringent film 805 may rotate periodically in a predetermined in-plane direction (e.g., a y-axis direction) with a uniform (or same) in-plane pitch $P_{in}$. The x-y sectional view of in-plane orientations of LC molecules 812 located in close proximity to or at a surface (e.g., at least one of the first surface 805-1 or the second surface 805-2) of the birefringent film 805 may be similar to the x-y sectional view of the in-plane orientations of the LC molecules 712 in the birefringent film 705 as shown in FIG. 7A. That is, the in-plane orientations of the LC molecules 812 may vary continuously and periodically in at least one in-plane direction with a uniform (or same) in-plane pitch $P_{in}$.

FIG. 8A schematically illustrates a y-z sectional view of a portion of out-of-plane orientations of the directors of the LC molecules 812 in the birefringent film 805 of the PBP element 800, according to an embodiment of the present disclosure. As shown in FIG. 8A, within a volume of the birefringent film 805, along the thickness direction (e.g., the z-axis direction) of the birefringent film 805, the directors (or the azimuth angles ϕ) of the LC molecules 812 may have a substantially same orientation (or value) from the first surface 805-1 to the second surface 805-2 of the birefringent film 805. In some embodiments, the thickness of the birefringent film 805 may be configured as d=λ/(2*Δn), where λ is a design wavelength, Δn is the birefringence of the LC material of the birefringent film 805, and Δn=$n_e$−$n_o$, $n_e$ and $n_o$ are the extraordinary and ordinary refractive indices of the LC material, respectively. In some embodiments, the PBP element 800 including the birefringent film 805 having the LC molecules 812 configured with the in-plane orientations similar to that shown in FIG. 7A and the out-of-plane orientations shown in FIG. 8A may function as a PBP grating (also referred to as 800 for discussion purposes) configured to provide a polarization selective diffraction. In some embodiments, a twist structure may be introduced along the thickness direction (e.g., a z-axis direction) of the birefringent film 805 and may be compensated for by its mirror twist structure, which may enable the PBP grating to have an achromatic performance.

FIG. 8B illustrates polarization selective diffractions of the PBP element 800, according to an embodiment of the present disclosure. The PBP element 800 may be a PBP grating. The PBP grating 800 may be a passive PBP grating or an active PBP grating. A passive PBP grating may have or may be configurable to operate in two optical states, a positive state or a negative state. The optical state of a PBP grating 800 may depend on the handedness of a circularly polarized input light, the handedness of the rotation of the directors of the LC molecules 812 at the surface (e.g., at least one of the first surface 805-1 or the second surface 805-2) of the birefringent film 805. An active PBP grating may have or may be configurable to operate in three optical states, a positive state, a negative state, or a neutral state. The optical state of an active PBP grating may depend on the handedness of a circularly polarized input light, the handedness of the rotation of the directors of the LC molecules 812 at the surface (e.g., at least one of the first surface 805-1 or the second surface 805-2) of the birefringent film 805, and a voltage applied to the active PBP grating. When a voltage applied to the active PBP grating via a power source controlled by a controller (not shown in FIG. 8A) is lower than a predetermined threshold voltage, the active PBP grating may operate in a positive state or a negative state. When the voltage applied to the active PBP grating is sufficiently high to reorient the LC molecules along the direction of a generated electric field, the active PBP grating may operate in a neutral state. The active PBP grating operating in a neutral state may not diffract a circularly polarized light, and may or may not affect the polarization of the circularly polarized light transmitted therethrough.

For example, as shown in FIG. 8B, the PBP grating 800 may operate in a positive state for an RHCP light 865 (having a wavelength in a predetermined wavelength range and an incidence angle in a predetermined incidence angle range), and may forwardly diffract the RHCP light 865 to a positive angle (e.g., +θ). The PBP grating 800 may operate in a negative state for an LHCP light 860 (having a wavelength in a predetermined wavelength range and an incidence angle in a predetermined incidence angle range), and may forwardly diffract the LHCP light 860 to a negative angle (e.g., −θ). The PBP grating 800 operating in the positive state or the negative state may reverse the handedness of a circularly polarized light transmitted therethrough in addition to diffracting the circularly polarized light. For example, as shown in FIG. 8B, the PBP grating 800 may forwardly diffract the RHCP light 865 as an LHCP light 885, and forwardly diffract the LHCP light 860 as an RHCP light 880. In some embodiments, although not shown, the PBP grating 800 may operate in a positive state for an LHCP light, and operate in a negative state for an RHCP light.

The disclosed optical systems for object tracking may have numerous applications in a large variety of fields, e.g., near-eye displays ("NEDs"), head-up displays ("HUDs"), head-mounted displays ("HMDs"), smart phones, laptops, televisions, vehicles, etc. For example, the disclosed optical systems may be implemented in various systems for augmented reality ("AR"), virtual reality ("VR"), and/or mixed reality ("MR") applications, to determine what content to provide to the user, to solve the vergence-accommodation conflict, to enable pupil steered AR, VR, and/or MR display systems (including, but not limited to, holographic near eye displays, retinal projection eyewear, and wedged waveguide displays), etc. The disclosed optical systems may be implemented in sensing modules to extend the detecting range of the sensors, increase detecting resolution or accuracy of the sensors, and/or reduce the signal processing time.

Figure 9A:
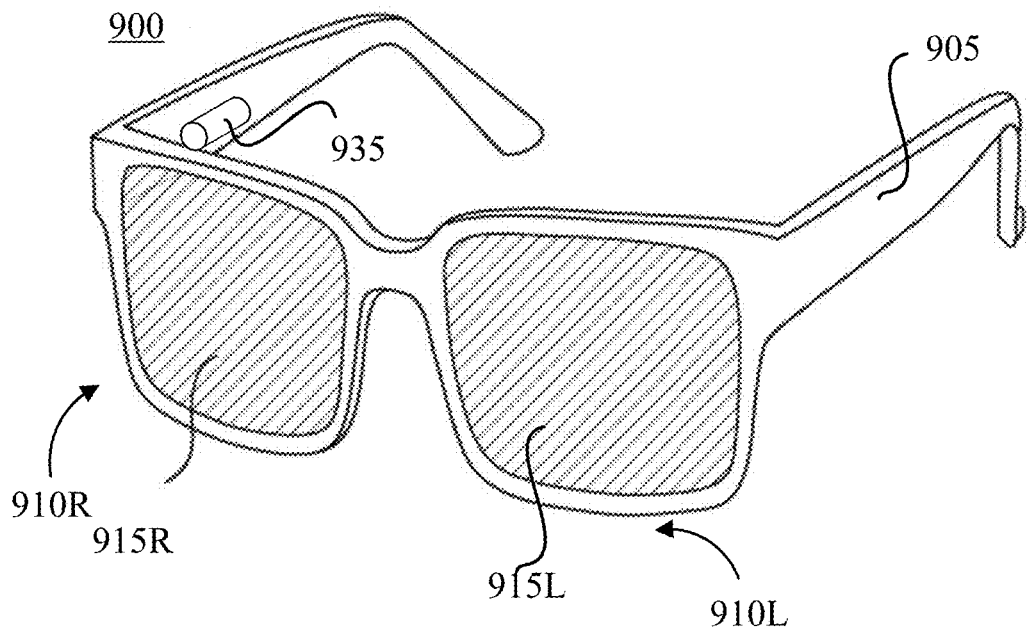
FIG. 9A is a schematic diagram of an NED, according to an embodiment of the disclosure.
Figure 9B:
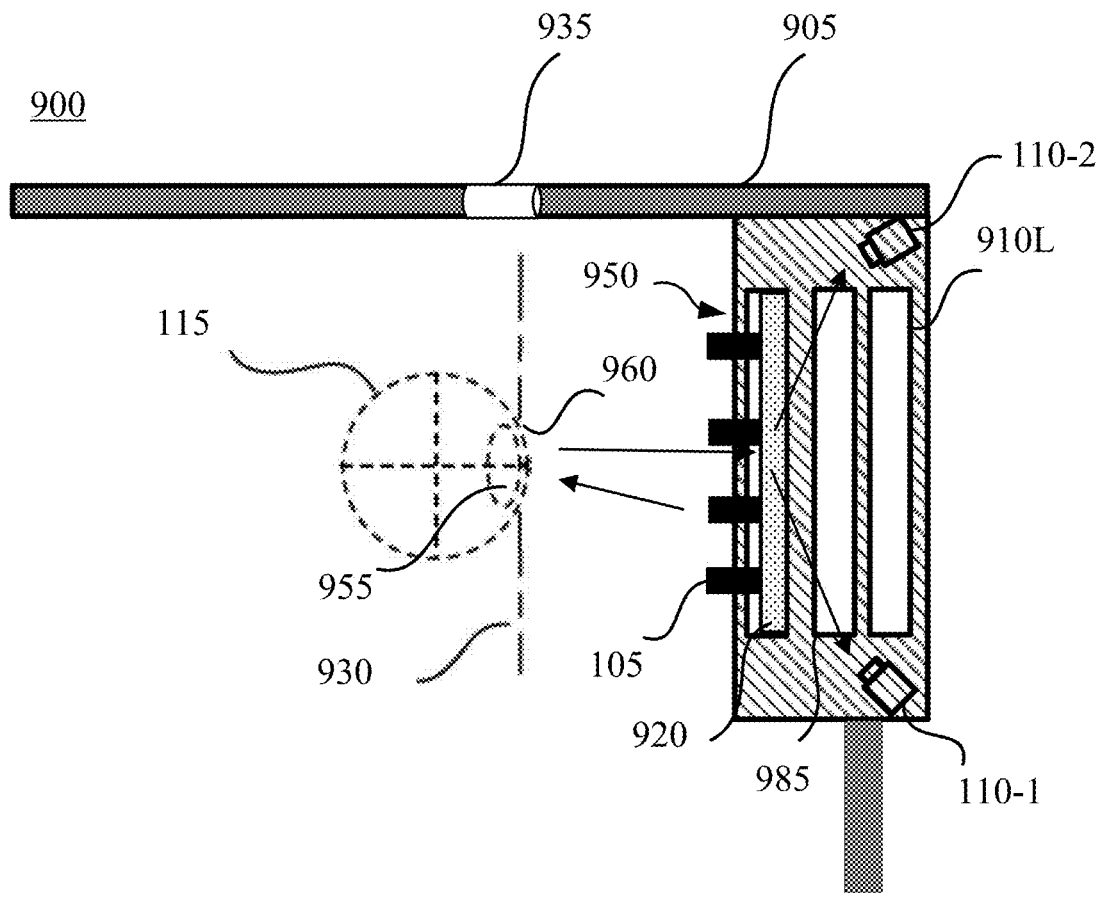
FIG. 9B is a cross sectional view of a half of the NED shown in FIG. 10A, according to an embodiment of the disclosure.

FIG. 9A illustrates a schematic diagram of a near-eye display ("NED") 900 according to an embodiment of the disclosure. FIG. 9B is a cross-sectional view of half of the NED 900 shown in FIG. 9A according to an embodiment of the disclosure. For purposes of illustration, FIG. 9B shows the cross-sectional view associated with a left-eye display system 910L. The NED 900 may include a controller (e.g., the controller 125), which is not shown in FIG. 9A or 9B. As shown in FIGS. 9A and 9B, the NED 900 may include a frame 905 configured to mount to a user's head. The frame 905 is merely an example structure to which various components of the NED 900 may be mounted. Other suitable fixtures may be used in place of or in addition to the frame 905. The NED 900 may include right-eye and left-eye display systems 910R and 910L mounted to the frame 905. The NED 900 may function as a VR device, an AR device, an MR device, or any combination thereof. In some embodiments, when the NED 900 functions as an AR or an MR device, the right-eye and left-eye display systems 910R and 910L may be entirely or partially transparent from the perspective of the user, which may provide the user with a view of a surrounding real-world environment. In some embodiments, when the NED 900 functions as a VR device, the right-eye and left-eye display systems 910R and 910L may be opaque, such that the user may be immersed in the VR imagery based on computer-generated images.

The right-eye and left-eye display systems 910R and 910L may include image display components configured to project computer-generated virtual images into left and right display windows 915L and 915R in a field of view ("FOV"). The right-eye and left-eye display systems 910R and 910L may be any suitable display systems. For illustrative purposes, FIG. 9A shows that the right-eye and left-eye display systems 910R and 910L may include a projector 935 coupled to the frame 905. The projector 935 may generate an image light representing a virtual image. As shown in FIG. 9B, the NED 900 may also include a lens system 985 and an object tracking system 950 (e.g., eye tracking system and/or face tracking system). The lens system 985 may be disposed between the object tracking system 950 and the left-eye display system 910L. The lens system 985 may be configured to guide the image light output from the left-eye display system 910L to an exit pupil 960. The exit pupil 960 may be a location where an eye pupil 955 of the eye 115 of the user is positioned in an eye-box region 930 of the left-eye display system 910L. In some embodiments, the lens system 985 may be configured to correct aberrations in the image light output from the left-eye display system 910L, magnify the image light output from the left-eye display system 910L, or perform another type of optical adjustment to the image light output from the left-eye display system 910L. The lens system 985 may include multiple optical elements, such as lenses, waveplates, reflectors, etc. In some embodiments, the lens system 985 may include a pancake lens configured to fold the optical path, thereby reducing the back focal distance in the NED 900.

The object tracking system 950 may be any embodiment of the object tracking system disclosed herein, such as the object tracking system 100 shown in FIG. 1A, the object tracking system 200 shown in FIG. 2A, the object tracking system 300 shown in FIG. 3, the object tracking system 400 shown in FIG. 4A, or the object tracking system 450 shown in FIG. 4B. With the object tracking system 950, multiple perspective views of the eye 115 and/or face of the user may be provided by the NED 900. The NED 900 may provide enhanced tracking accuracy and tracking range for eye tracking and/or face tracking. Information obtained during eye tracking and/or face tracking may be used for determining the type of information to be presented to the user of the NED 900 and/or the arrangement of the displayed content on a display screen of the NED 900, addressing the vergence-accommodation conflict, and improving display quality and performance of the NED 900. Accordingly, the user experience of the NED 900 may be enhanced.

For purposes of illustration, FIG. 9B shows that the object tracking system 950 may be similar to the object tracking system 100 shown in FIG. 1A. For example, the object tracking system 950 may include four light sources 105 configured to emit a light to illuminate the eye 115, a polarization selective optical element 920 configured to split (e.g., deflect) the light reflected by the eye 115 as two signal lights, and two optical sensors 110-1 and 110-2 configured to receive the two signal lights and generate tracking signals based on the received signal lights. Detailed descriptions of the light propagation can refer to the above descriptions rendered in connection with FIG. 1A. A controller (e.g., the controller 125 shown in FIG. 1A) may generate different perspective images of the eye 115 based on the tracking signals generated by the optical sensors 110-1 and 110-2, respectively. The polarization selective optical element 920 may be similar to the polarization selective optical element 120 shown in FIG. 1A, e.g., a transmissive polarization selective optical element. The optical sensors 110-1 and 110-2 and the eye 115 may be disposed at two different sides of the polarization selective optical element 920.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A system, comprising:
a polarization selective optical element configured to diffract a light reflected by an object into a plurality of signal lights; and
at least one optical sensor configured to receive the signal lights and generate a plurality of tracking signals for tracking the object,
wherein the at least one optical sensor includes a plurality of optical sensors spaced apart from one another, and configured to receive the plurality of signal lights.

2. The system of claim 1, wherein at least two of the plurality of signal lights have orthogonal polarizations.

3. The system of claim 1, wherein the plurality of optical sensors are disposed at different sides of the object that is tracked, and are configured to receive the signal lights propagating in different directions.

4. The system of claim 1, wherein the plurality of optical sensors are disposed at the same side of the object that is tracked, and are coupled with a plurality of reflectors configured to selectively reflect the signal lights toward the optical sensors.

5. The system of claim 1, wherein the polarization selective optical element includes at least one of sub-wavelength structures, a birefringent material, or a photo-refractive holographic material.

6. The system of claim 1,
wherein the polarization selective optical element includes a Pancharatnam-Berry phase ("PBP") element configured to diffract a first component of the light reflected by the object as a first signal light of the plurality of signal lights, and diffract a second component of the light reflected by the object as a second signal light of the plurality of signal lights, and
wherein the first signal light and the second signal light have diffraction angles of opposite signs.

7. The system of claim 1, wherein the polarization selective optical element includes a stack of a first polarization volume hologram ("PVH") element and a second PVH element configured with opposite polarization selectivities.

8. The system of claim 7,
wherein the first PVH element is configured to diffract a first component of the light reflected by the object as a first signal light of the plurality of signal lights,
wherein the second PVH element is configured to diffract a second component of the light reflected by the object as a second signal light of the plurality of signal lights, and
wherein the first signal light and the second signal light have diffraction angles of opposite signs or the same sign.

9. The system of claim 7,
wherein the first PVH element and the second PVH element are configured with a first predetermined operating wavelength range,
wherein the system further includes a third PVH element and a fourth PVH stacked with the first PVH element and the second PVH element, the third PVH element and the fourth PVH element being configured with opposite polarization selectivities, and
wherein the third PVH element and the fourth PVH element are configured with a second predetermined operating wavelength range different from the first predetermined operating wavelength range.

10. The system of claim 9,
wherein the third PVH element is configured to diffract a third component of the light reflected by the object as a third signal light of the plurality of signal lights, and
wherein the fourth PVH element is configured to diffract a fourth component of the light reflected by the object as a fourth signal light of the plurality of signal lights, and
wherein the third signal light and the fourth signal light have diffraction angles of opposite signs or the same sign.

11. An optical element, comprising:
a primary birefringent medium layer having a first birefringence; and
two or more secondary birefringent medium layers stacked with the primary birefringent medium layer and distributed at both sides of the primary birefringent medium layer, the two or more secondary birefringent medium layers having two or more birefringences,
wherein the primary birefringent medium layer and the two or more secondary birefringent medium layers include birefringent materials having chiralities, and
wherein the first birefringence is greater than the two or more birefringences.

12. The optical element of claim 11, wherein the two or more secondary birefringent medium layers are symmetrically distributed at both sides of the primary birefringent medium layer.

13. The optical element of claim 11, wherein the two or more secondary birefringent medium layers are asymmetrically distributed at both sides of the primary birefringent medium layer.

14. A system, comprising:
a light source configured to emit a light to illuminate an object, the light being reflected by the object;
a polarization selective optical element configured to diffract the light reflected by the object into a plurality of signal lights; and
at least one optical sensor configured to receive the signal lights and generate a plurality of tracking signals for tracking the object,
wherein the at least one optical sensor includes at least two optical sensors configured to receive at least two of the plurality of signal lights with orthogonal polarizations, respectively.

15. The system of claim 14, wherein at least two of the plurality of signal lights have orthogonal polarizations.

16. The system of claim 14, wherein the at least two optical sensors are disposed at different sides of the object that is tracked, and are configured to receive the signal lights propagating in different directions.

17. The system of claim 14, wherein the at least two optical sensors are disposed at the same side of the object that is tracked, and are coupled with a plurality of reflectors configured to selectively reflect the signal lights toward the at least two optical sensors.

18. The system of claim 14, wherein the polarization selective optical element includes at least one of sub-wavelength structures, a birefringent material, or a photo-refractive holographic material.

19. The system of claim 14,
wherein the polarization selective optical element includes a Pancharatnam-Berry phase ("PBP") element configured to diffract a first component of the light reflected by the object as a first signal light of the plurality of signal lights, and diffract a second component of the light reflected by the object as a second signal light of the plurality of signal lights, and
wherein the first signal light and the second signal light have diffraction angles of opposite signs.

20. The system of claim 14, wherein the polarization selective optical element includes a stack of a first polarization volume hologram ("PVH") element and a second PVH element configured with opposite polarization selectivities.

* * * * *